US012601626B2

(12) United States Patent
Ballaro et al.

(10) Patent No.: US 12,601,626 B2
(45) Date of Patent: Apr. 14, 2026

(54) SYSTEMS FOR DETERMINING VEHICLE FUEL LEVEL

(71) Applicant: Geotab Inc., Oakville (CA)

(72) Inventors: Justin Russell Ballaro, Hamilton (CA); Young Seok Shin, Kitchener (CA); Nadia Sophia Stefopulos, Scarborough (CA)

(73) Assignee: Geotab Inc., Oakville (CA)

( * ) Notice: Subject to any disclaimer, the term of this patent is extended or adjusted under 35 U.S.C. 154(b) by 0 days.

(21) Appl. No.: 19/200,194

(22) Filed: May 6, 2025

(65) Prior Publication Data

US 2026/0071908 A1 Mar. 12, 2026

Related U.S. Application Data

(60) Provisional application No. 63/693,409, filed on Sep. 11, 2024.

(51) Int. Cl.
*G01F 23/80* (2022.01)
*G06Q 20/10* (2012.01)
*G07C 5/04* (2006.01)

(52) U.S. Cl.
CPC ......... *G01F 23/804* (2022.01); *G06Q 20/108* (2013.01); *G07C 5/04* (2013.01)

(58) Field of Classification Search
CPC ........ G01F 23/804; G06Q 20/108; G07C 5/04
USPC ....................................................... 701/32.1
See application file for complete search history.

(56) References Cited

U.S. PATENT DOCUMENTS

| | | | | |
|---|---|---|---|---|
| 6,006,148 | A * | 12/1999 | Strong | G07C 5/008 |
| | | | | 705/13 |
| 6,092,021 | A | 7/2000 | Ehlbeck et al. | |
| 7,587,939 | B2 | 9/2009 | Miceli et al. | |
| 8,733,167 | B2 * | 5/2014 | Windbergs | G01F 23/804 |
| | | | | 73/1.73 |
| 10,040,459 | B1 | 8/2018 | Kukreja | |
| 10,823,125 | B1 * | 11/2020 | Kilaru | B60K 15/03 |
| 2001/0037298 | A1 * | 11/2001 | Ehrman | G06Q 30/0645 |
| | | | | 705/40 |
| 2006/0167593 | A1 * | 7/2006 | Eckles | G08G 1/205 |
| | | | | 701/1 |
| 2007/0093215 | A1 * | 4/2007 | Mervine | G08G 1/205 |
| | | | | 455/99 |
| 2017/0206475 | A1 * | 7/2017 | Shoen | G06Q 30/0645 |
| 2020/0226559 | A1 * | 7/2020 | Boss | G06F 16/23 |
| 2021/0256837 | A1 * | 8/2021 | DeQuarto | G08C 17/02 |
| 2022/0126856 | A1 | 4/2022 | Palmer et al. | |
| 2024/0127632 | A1 * | 4/2024 | Mckearin | G06Q 30/01 |

(Continued)

OTHER PUBLICATIONS

International Search Report and Written Opinion for International Application No. PCT/CA2025/051187, mailed Dec. 11, 2025, 9 pages.

*Primary Examiner* — Tyler D Paige
(74) *Attorney, Agent, or Firm* — Mark Pringle-Rigby

(57) ABSTRACT

Systems, methods, devices, and models determining fuel level in vehicles are described. Fuel tank capacity often extends beyond what can be measured by a fuel level sensor. Herein, fuel level data is augmented with fuel consumption data or fuel consumption rate to estimate a fuel level in a fuel tank when a fuel level sensor reads 100%. Fuel consumed until the fuel level sensor reads less than 100% can be added to measurable capacity of the tank to determine an initial volume of fuel in the tank.

14 Claims, 11 Drawing Sheets

(56)          References Cited

U.S. PATENT DOCUMENTS

2024/0210231 A1*   6/2024   Arras ...................... G01F 23/14
2024/0412720 A1*   12/2024   Vasylyev .......... G06F 16/90332

* cited by examiner

300

| Tank Volume remaining (L) | Measured Fuel Level (%) | Calibration Factor L / % |
|---|---|---|
| 3.26 | 2.70% | 1.207407407 |
| 18.09 | 22.00% | 0.8222727273 |
| 32.91 | 39.40% | 0.8352791878 |
| 47.74 | 51.80% | 0.9216216216 |
| 62.56 | 71.80% | 0.8713091922 |
| 77.39 | 88.20% | 0.8774376417 |
| 88.81 | 100.00% | 0.8881 |
| 93 | 100.00% | |

| User | Initial Fuel Volume (L) | Final Fuel Volume (L) | Difference (L) | Action |
|------|-------------------------|------------------------|----------------|--------|
| 1 | 93 | 92.8 | -0.2 | None |
| 2 | 92.8 | 89 | -3.8 | Debit |
| 3 | 89 | 93 | +4 | Credit |
| ... | ... | ... |  | ... |

702 — Alert: Debit User 2 for 3.8 L

704 — Alert: Credit User 3 for 4 L

| User | Recent Underfill Events | Recent Plentiful Fill Events | Action |
|------|--------------------------|------------------------------|--------|
| 1 | 0 | 0 | Default |
| 2 | 4 | 0 | Deposit Required |
| 3 | 0 | 5 | Trusted User |
| ... | ... | ... | ... |

810    820    830    840

800

SYSTEMS FOR DETERMINING VEHICLE FUEL LEVEL

PRIOR APPLICATION DATA

This application claims priority to U.S. Provisional Patent Application No. 63/693,409, titled "Methods and Systems for Determining Fuel Level", filed on Sep. 11, 2024.

TECHNICAL FIELD

The present disclosure generally relates to systems, devices, methods, and models for determining fuel level in vehicles, and in particular relates to determining fuel level which is not accurately measurable.

BACKGROUND

Many types of vehicles consume fuel in order to operate. Such fuels include fossil fuels and derivatives thereof (e.g. gasoline, diesel etc.), but can also include alternative fuels such as biodiesel, ethanol, etc. Such fuel is carried by a tank attached to or integrated with a vehicle, and is consumed as the vehicle is utilized. It is desirable to know how much fuel is in a tank of a vehicle, to enable effective management of the vehicle.

SUMMARY

According to a broad aspect, the present disclosure describes a system comprising: at least one processor; and at least one non-transitory processor-readable storage medium, the at least one non-transitory processor-readable storage medium storing processor-executable instructions which, when executed by the at least one processor cause the system to: access measured fuel level data for a vehicle, the measured fuel level data indicating a first measured fuel level $f_l(t_{1e})$ for a fuel tank of the vehicle as measured by a fuel level sensor at an end $t_{1e}$ of a first period $t_1$; if the first measured fuel level $f_l(t_{1e})$ is less than 100%, determine, by the at least one processor, a final fuel volume $V(t_{1e})$ for the first period $t_1$ as fuel volume corresponding to the first measured fuel level $f_l(t_{1e})$; if the first measured fuel level $f_l(t_{1e})$ is 100%: access further measured fuel level data for a vehicle, the measured fuel level data indicating a second measured fuel level $f_l(t_2)$ for the fuel tank of the vehicle as measured by the fuel level sensor from a start $t_{2s}$ of a second period $t_2$, the start $t_{2s}$ of the second period $t_2$ being after an end $t_{1e}$ of the first period $t_1$; after the second measured fuel level $f_l(t_2)$ falls below 100% at a time $t_{<100}$ during the second period $t_2$, determine, by the at least one processor, a fuel adjustment value $f_A$ as fuel consumed between start $t_{2s}$ of the second period $t_2$ and the time $t_{<100}$, based on a fuel consumption rate of the vehicle; determine, by the at least one processor, an adjusted fuel volume $V_A$ as a measurable capacity $V_{max}$ of the fuel tank plus the fuel adjustment value $f_A$; and determine, by the at least one processor, the final fuel volume $V(t_{1e})$ for the first period $t_1$ as the adjusted fuel volume $V_A$; and trigger account rectification based on the final fuel volume $V(t_{1e})$.

The system may further comprise the fuel level sensor which captures the measured fuel level data and the further measured fuel level data.

The system may further comprise: at least one telematics device installed at the vehicle to receive fuel consumption data indicating the fuel consumption rate of the vehicle during the second period.

The processor-executable instructions may further cause the system to: access an indication of initial fuel volume $V(t_{1s})$ for start $t_{1s}$ of the first period $t_1$; and determine, by the at least one processor, a difference D between the initial fuel volume $V(t_{1s})$ and the final fuel volume $V(t_{1e})$. The first period $t_1$ may be a period where the vehicle is provided for use by a first user; the second period $t_2$ may be a period where the vehicle is provided for use by a second user different from the first user; and the processor-executable instructions may further cause the system to: access an account associated with the first user; and balance the account associated with the first user in accordance with the difference D. The processor-executable instructions may further cause the system to: compare, by the at least one processor, the difference D to a threshold; and if the difference D exceeds the threshold, send an alert to a system operator indicating the difference D exceeds the threshold.

The processor-executable instructions may further cause the system to: access the fuel consumption rate for the vehicle as a stored nominal fuel consumption rate.

The processor-executable instructions may further cause the system to, prior to the first period: access historic fuel level data for the vehicle as collected by the fuel sensor; access operational data for the vehicle as collected by a telematics device installed at the vehicle; and determine, by the at least one processor, the fuel consumption rate as a dynamic fuel consumption rate based on changes in fuel level as indicated in the historic fuel level data, associated with the operational data. The operational data for the vehicle may comprise location data for the vehicle; and the processor-executable instructions which cause the at least one processor to determine the fuel consumption rate as a dynamic fuel consumption rate based on changes in fuel level as indicated in the historic fuel level data, associated with the operational data, may cause the at least one processor to: determine distance travelled by the vehicle over each interval of a plurality of intervals based on the location data; determine fuel consumed for each interval of the plurality of intervals based on a respective difference in fuel level represented in the historic fuel level data over each interval; and determine the fuel consumption rate as a fuel consumption per distance travelled rate based on correlation between the distance travelled and the fuel consumed for each interval of the plurality of intervals. The operational data may comprise speed data for the vehicle; and the processor-executable instructions which cause the at least one processor to determine the fuel consumption rate as a dynamic fuel consumption rate based on changes in fuel level as indicated in the historic fuel level data, associated with the operational data, may cause the at least one processor to: determine speed of the vehicle over each interval of a plurality of intervals; determine fuel consumed for each interval of the plurality of intervals based on a respective difference in fuel level represented in the historic fuel level data over each interval; and determine the fuel consumption rate as a speed-dependent fuel consumption per time rate based on correlation between vehicle speed, fuel consumed, and interval length for each interval of the plurality of intervals.

The system may further comprise: the fuel sensor at the vehicle; and a communication interface at the vehicle, the at least one processor may include a first processor at the vehicle, and the processor-executable instructions may further cause the system to: capture, by the fuel level sensor at the vehicle, raw fuel level data; generate, by the first processor, simplified fuel level data by selectively filtering data points of the raw fuel level data, the simplified fuel level data including the measured fuel level data and the further measured fuel level data; and transmit, by the communication interface, the simplified fuel level data. The processor-executable instructions which cause the first processor to generate the simplified fuel level data by selectively filtering data points of the raw fuel level data may cause the first processor to: identify select data points from the raw fuel level data for inclusion in the simplified fuel level data, based on differences between the select data points and iteratively-defined reference lines through portions of the raw fuel level data; and compile the select data points as the simplified fuel level data, excluding data points which are not identified as select data points. The processor-executable instructions may further cause the system to: identify, by the first processor, a threshold data point based on when the raw fuel level data indicates that fuel level of the vehicle has dropped below 100%; and include, by the first processor, the data corresponding to the threshold data point in the simplified fuel level data.

The system may further comprise a telematics device positioned at the vehicle, the at least one processor may include a first processor at the vehicle; and the processor executable instructions may further cause the system to: collect, by the telematics device, operation data representing kinetic operation of the vehicle; collect, by the telematics device, raw fuel level data indicative of a fuel level in a fuel tank of the vehicle; identify, by the first processor, data points of the operation data which are outside of stability criteria; and for operation data which is outside the stability criteria, exclude corresponding raw fuel level data from the measured fuel level data and the further measured fuel level data.

According to another broad aspect, the present disclosure describes a method comprising: accessing measured fuel level data for a vehicle, the measured fuel level data indicating a first measured fuel level $f_l(t_{1_e})$ for a fuel tank of the vehicle as measured by a fuel level sensor at an end $t_{1_e}$ of a first period $t_1$; if the first measured fuel level $f_l(t_{1_e})$ is less than 100%, determining, by at least one processor, a final fuel volume $V(t_{1_e})$ for the first period $t_1$ as fuel volume corresponding to the first measured fuel level $f_l(t_{1_e})$; if the first measured fuel level $f_l(t_{1_e})$ is 100%: accessing further measured fuel level data for a vehicle, the measured fuel level data indicating a second measured fuel level $f_l(t_2)$ for the fuel tank of the vehicle as measured by the fuel level sensor from a start $t_{2_s}$ of a second period $t_2$, the start $t_{2_s}$ of the second period $t_2$ being after an end $t_{1_e}$ of the first period $t_1$; after the second measured fuel level $f_l(t_2)$ falls below 100% at a time $t_{<100}$ during the second period $t_2$, determining, by the at least one processor, a fuel adjustment value $f_A$ as fuel consumed between start $t_{2_s}$ of the second period $t_2$ and the time $t_{<100}$, based on a fuel consumption rate of the vehicle; determining, by the at least one processor, an adjusted fuel volume $V_A$ as a measurable capacity $V_{max}$, of the fuel tank plus the fuel adjustment value $f_A$; and determining, by the at least one processor, the final fuel volume $V(t_{1_e})$ for the first period $t_1$ as the adjusted fuel volume $V_A$; and triggering account rectification based on the final fuel volume $V(t_{1_e})$.

The method may further comprise: capturing, by the fuel level sensor, the measured fuel level data and the further measured fuel level data.

The method may further comprise: receiving, by at least one telematics device installed at the vehicle, fuel consumption data indicating the fuel consumption rate of the vehicle during the second period.

The method may further comprise: accessing an indication of initial fuel volume $V(t_{1_s})$ for start $t_{1_s}$ of the first period $t_1$; and determining, by the at least one processor, a difference D between the initial fuel volume $V(t_{1_s})$ and the final fuel volume $V(t_{1_e})$. The first period $t_1$ may be a period where the vehicle is provided for use by a first user; the second period $t_2$ may be a period where the vehicle is provided for use by a second user different from the first user; and the method may further comprise: accessing an account associated with the first user; and balancing the account associated with the first user in accordance with the difference D. The method may further comprise: comparing, by the at least one processor, the difference D to a threshold; and if the difference D exceeds the threshold, sending an alert to a system operator indicating the difference D exceeds the threshold.

The method may further comprise: accessing the fuel consumption rate for the vehicle as a stored nominal fuel consumption rate.

The method may further comprise, prior to the first period: accessing historic fuel level data for the vehicle as collected by the fuel sensor; accessing operational data for the vehicle as collected by a telematics device installed at the vehicle; and determining, by the at least one processor, the fuel consumption rate as a dynamic fuel consumption rate based on changes in fuel level as indicated in the historic fuel level data, associated with the operational data. The operational data for the vehicle may comprise location data for the vehicle; and determining the fuel consumption rate as a dynamic fuel consumption rate based on changes in fuel level as indicated in the historic fuel level data, associated with the operational data, may comprise: determining distance travelled by the vehicle over each interval of a plurality of intervals based on the location data; determining fuel consumed for each interval of the plurality of intervals based on a respective difference in fuel level represented in the historic fuel level data over each interval; and determining the fuel consumption rate as a fuel consumption per distance travelled rate based on correlation between distance travelled and the fuel consumed for each interval of the plurality of intervals. The operational data may comprise speed data for the vehicle; and determining the fuel consumption rate as a dynamic fuel consumption rate based on changes in fuel level as indicated in the historic fuel level data, associated with the operational data, may comprise: determining speed of the vehicle over each interval of a plurality of intervals; determining fuel consumed for each interval of the plurality of intervals based on a respective difference in fuel level represented in the historic fuel level data over each interval; and determining the fuel consumption rate as a speed-dependent fuel consumption per time rate based on correlation between vehicle speed, fuel consumed, and interval length for each interval of the plurality of intervals.

The method may further comprise: capturing, by the fuel level sensor at the vehicle, raw fuel level data; generating, by a first processor of the at least one processor and positioned at the vehicle, simplified fuel level data by selectively filtering data points of the raw fuel level data, the simplified fuel level data including the measured fuel level data and the further measured fuel level data; and transmitting, by a communication interface at the vehicle, the simplified fuel level data. Generating the simplified fuel level data by selectively filtering data points of the raw fuel level data may comprise: identifying select data points from the raw fuel level data for inclusion in the simplified fuel level data, based on differences between the select data points and iteratively-defined reference lines through portions of the raw fuel level data; and compiling the select data points as the simplified fuel level data, excluding data points which are not identified as select data points. The method may further comprise: identifying, by the first processor, a threshold data point based on when the raw fuel level data indicates that fuel level of the vehicle has dropped below 100%; and including, by the first processor, the data corresponding to the threshold data point in the simplified fuel level data.

The method may further comprise: collecting, by a telematics device installed at the vehicle, operation data representing kinetic operation of the vehicle; collecting, by the telematics device, raw fuel level data indicative of a fuel level in a fuel tank of the vehicle; identifying, data points of the operation data which are outside of stability criteria; and for operation data which is outside the stability criteria, exclude corresponding raw fuel level data from the measured fuel level data and the further measured fuel level data.

According to yet another broad aspect, the present disclosure describes a method comprising: accessing a library of fuel level data for a vehicle; accessing a library of fuel consumption data for a vehicle; iteratively for a plurality of sets of data points in the library of fuel level data: identifying two points of the fuel level data which are indicative of a change in fuel level of the vehicle; identifying respective timestamps of the two points of fuel level data; determining fuel consumption of the vehicle between the respective timestamps based on the fuel consumption data; determine a difference between the determined fuel consumption of the vehicle based on the fuel consumption data and the change in fuel level based on the fuel level data; store the determined difference as a calibration factor; aggregating stored fuel level adjustment factors over a measurable range of a fuel level sensor which captures the fuel level data, to generate a fuel level calibration scheme.

BRIEF DESCRIPTION OF THE DRAWINGS

Exemplary non-limiting embodiments are described with reference to the accompanying drawings in which.

DETAILED DESCRIPTION

The present disclosure details systems, devices, methods, and models for determining fuel level of vehicles. Accurate fuel level information for vehicles helps to effectively manage the vehicles, particularly in a fleet setting. As a non-limiting example, fuel level information can be used for a vehicle rental fleet, to determine whether a vehicle has been refueled on return, or to determine a difference in fuel level to charge, credit, or debit a user. It is desirable for accurate fuel level information to be made available to a management device which manages vehicles in the fleet, such as a central management server.

Figure 1:
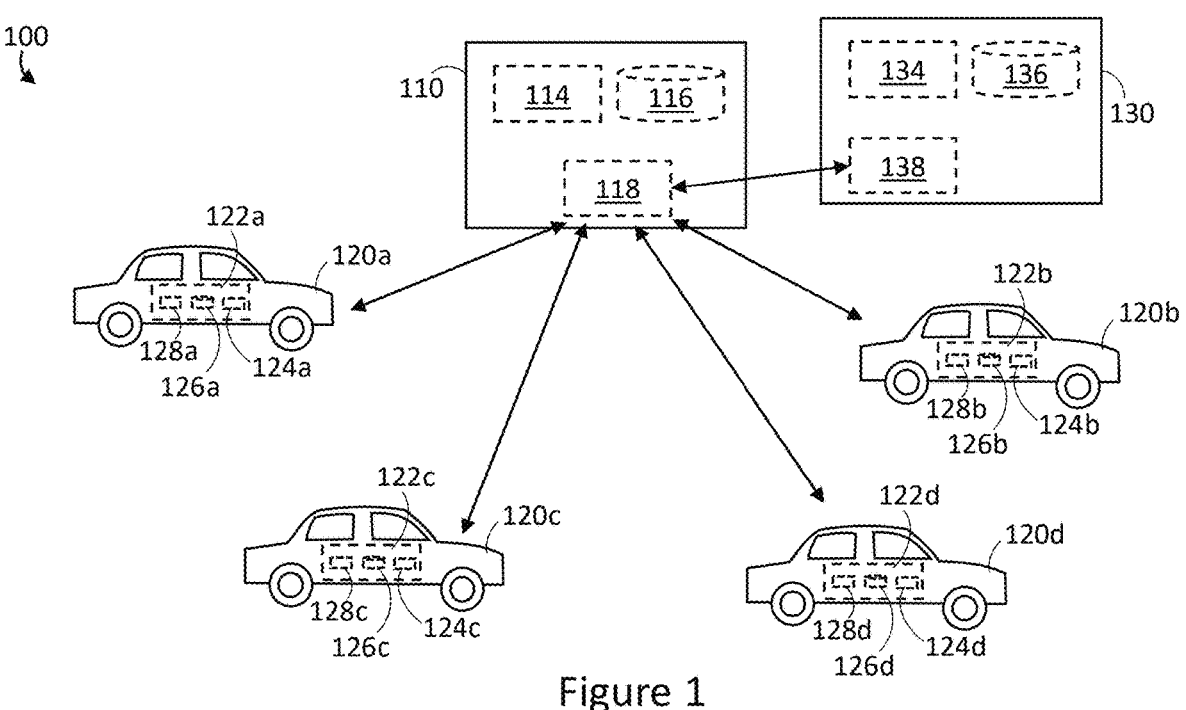
FIG. 1 is a schematic view of a system for managing data for a plurality of vehicles.

FIG. 1 is a schematic view of a system 100 for managing data for a plurality of vehicles. FIG. 1 shows a management device 110, which includes at least one processor 114, at least one non-transitory processor-readable storage medium 116, and a communication interface 118. Although illustrated as one device, management device 110 can include a plurality of devices, a plurality of processors 114, a plurality of non-transitory processor-readable storage mediums 116, and/or a plurality of communication interfaces 118. Further, such a plurality of management devices can be in close proximity (e.g. in a central server location), or can be distributed across different locations (e.g. as remote devices). Communication interface 118 can be a wired or wireless interface, through which management device 110 communicates with other devices, such as a plurality of vehicles, vehicle devices, or user devices.

In the illustrated example, management device 110 is shown as communicating with vehicle devices in four vehicles 120a, 120b, 120c, and 120d (collectively referred to as vehicles 120). However, management device 110 could communicate with vehicle devices in any appropriate number of vehicles, such as one vehicle, dozens of vehicles, hundreds of vehicles, thousands of vehicles, or even more vehicles. In some exemplary implementations, management device 110 is a telematics server, which collects and stores telematics data for a fleet of vehicles. In other exemplary implementations, management device 110 is a location-specific device, which manages vehicles for a particular location (or vehicles for a plurality of locations). In any of these examples, management device 110 can be used to monitor fuel level for vehicles.

Vehicle 120a includes at least one processor 124a, at least one non-transitory processor-readable storage medium 126a, and a communication interface 128a. Together, the at least one processor 124a, the at least one non-transitory processor-readable storage medium 126a, and the communication interface 128a can be referred to as "vehicle device" 122a.

Vehicle 120b includes at least one processor 124b, at least one non-transitory processor-readable storage medium 126b, and a communication interface 128b. Together, the at least one processor 124b, the at least one non-transitory processor-readable storage medium 126b, and the communication interface 128b can be referred to as "vehicle device" 122b.

Vehicle 120c includes at least one processor 124c, at least one non-transitory processor-readable storage medium 126c, and a communication interface 128c. Together, the at least one processor 124c, the at least one non-transitory processor-readable storage medium 126*c*, and the communication interface 128*c* can be referred to as "vehicle device" 122*c*.

Vehicle 120*d* includes at least one processor 124*d*, at least one non-transitory processor-readable storage medium 126*d*, and a communication interface 128*d*. Together, the at least one processor 124*d*, the at least one non-transitory processor-readable storage medium 126*d*, and the communication interface 128*d* can be referred to as "vehicle device" 122*d*.

Collectively, vehicle 120*a*, vehicle 120*b*, vehicle 120*c*, and vehicle 120*d* can be referred to as "vehicles 120". Collectively, the at least one processor 124*a*, the at least one processor 124*b*, the at least one processor 124*c*, and the at least one processor 124*d* can be referred to as "processors 124". Collectively, the at least one non-transitory processor-readable storage medium 126*a*, the at least one non-transitory processor-readable storage medium 126*b*, the at least one non-transitory processor-readable storage medium 126*c*, and the at least one non-transitory processor-readable storage medium 126*d* can be referred to as "non-transitory processor-readable storage mediums 126". Collectively, communication interface 128*a*, communication interface 128*b*, communication interface 128*c*, and communication interface 128*d* can be referred to as "communication interfaces 128". Collectively, vehicle device 122*a*, vehicle device 122*b*, vehicle device 122*c*, and vehicle device 122*d* can be referred to as "vehicle devices 122".

Any of the communication interfaces 128 can be a wired interface or a wireless interface, or a vehicle device can include both a wired communication interface and a wireless communication interface.

Each of vehicle devices 122 can be a monolithically packaged device (i.e. a device contained in a single housing) which is installed in a respective vehicle. For example, any of vehicle devices 122 could be a telematics device, which plugs into the respective vehicle (e.g. at the OBDII port). Such telematics devices can gather vehicle information from the vehicle, from sensors built into the telematics device itself, and communicate said information to management devices such as management device 110. An exemplary telematics device is discussed later with reference to FIG. 2. In some implementations, each vehicle device 122 can instead refer to the collection of components installed in a vehicle (i.e. they do not have to be packaged in a single housing). As an example, a vehicle manufacturer could install processing, storage, and communication equipment in vehicles for the purpose of collecting, processing, and transmitting data. Further, components of any of the vehicle devices 122 can be multi-purpose components which serve other functions within the vehicle.

Management device 110 can communicate with vehicle devices 122 over a communication network, which may include one or more computing systems and may be any suitable combination of networks or portions thereof to facilitate communication between network components. Some examples of networks include, Wide Area Networks (WANs), Local Area Networks (LANs), Wireless Wide Area Networks (WWANs), data networks, cellular networks, voice networks, among other networks, which may be wired and/or wireless. The communication network may operate according to one or more communication protocols, such as, General Packet Radio Service (GPRS), Universal Mobile Telecommunications Service (UMTS), GSM, Enhanced Data Rates for GSM Evolution (EDGE), LTE, CDMA, LPWAN, Wi-Fi, Bluetooth, Ethernet, HTTP/S, TCP, and CoAP/DTLS, or other suitable protocol. The communication network may take other forms as well.

FIG. 1 also shows an optional device 130, which includes at least one processor 134, at least one non-transitory processor-readable storage medium 136, and a communication interface 138. Although illustrated as one device, device 130 can include a plurality of devices, a plurality of processors 134, a plurality of non-transitory processor-readable storage mediums 136, and/or a plurality of communication interfaces 138. Further, such a plurality of devices can be in close proximity (e.g. in a central server location), or can be distributed across different locations (e.g. as remote devices). Communication interface 138 can be a wired or wireless interface, through which device 130 communicates with other devices.

In the illustrated example, device 130 communicates with management device 110 via communication interfaces 118 and 138. Such communication can be direct or indirect (e.g. over the internet or any other network). Device 130 can perform processing and provide data to management device 110, which management device 110 in turn uses to manage at least one fleet or group of vehicles (e.g. vehicles 120). As an example, management device 110 may be owned by one entity, which manages a fleet of vehicles. Device 130 may belong to another entity, which provides services to many fleets of vehicles. As a result, device 130 may have access to more vehicle data (i.e. data from a larger quantity of vehicles) compared to management device 110. In an exemplary use case, device 130 may generate metrics, models, or profiles for at least one plurality of vehicles, based on a large amount of vehicle data available to device 130. In this exemplary use case, device 130 communicates such metrics, models, or profiles to management device 110, which management device 110 then uses to perform analysis, assessment, or prediction for similar vehicles in a fleet managed by management device 110 (e.g. vehicles 120). In this way, management device 110 can assess models for vehicles based on a large amount of statistical data that management device 110 itself does not have access to. As another example, management device 110 may be a management device for a specific location (e.g. vehicle lot, warehouse, or hub), such that management device 110 manages vehicles which operate out of said location. In such an example, device 130 may be a fleet management device, which manages vehicles in a fleet across multiple locations (e.g. all locations, or a subset of locations).

Figure 2:
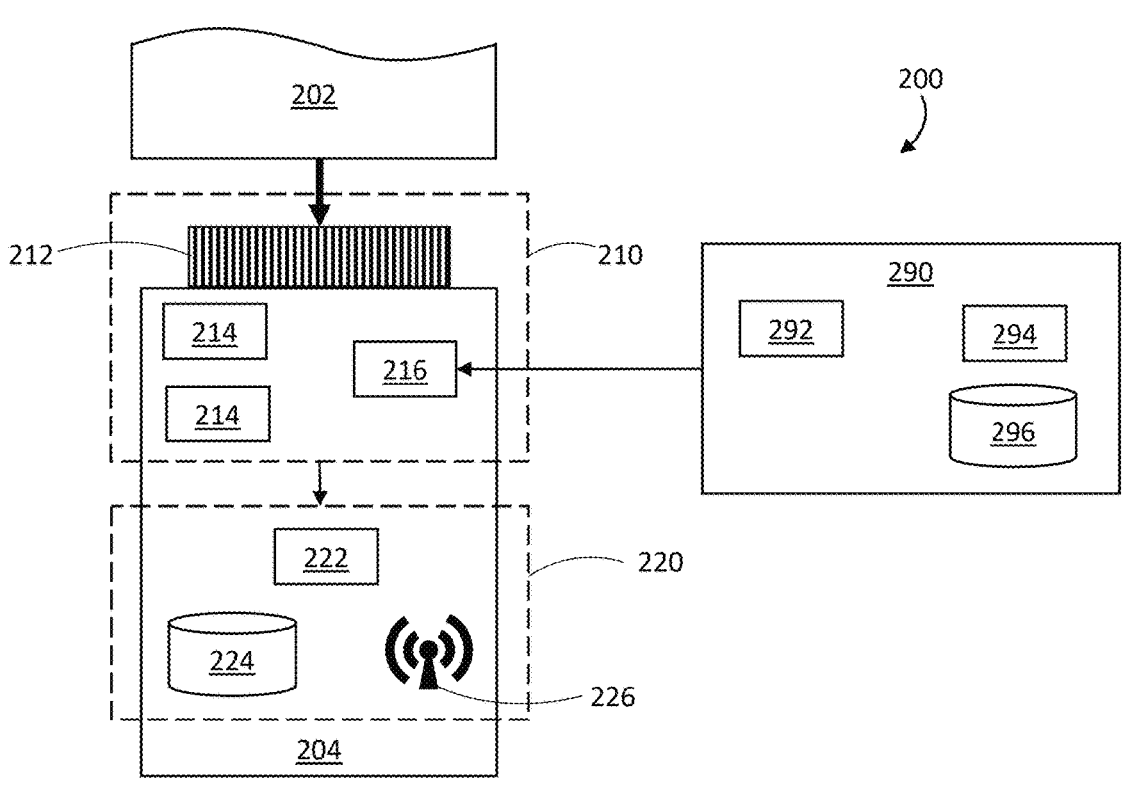
FIG. 2 is a schematic diagram of a system including a vehicle device, in accordance with at least one illustrated implementation.

FIG. 2 is a schematic diagram of a system 200, including a telematic device 204 which communicatively couples to a vehicle by a port 202 of the vehicle. Telematic device 204 is one exemplary implementation of a vehicle device, such as vehicle devices 122 discussed earlier with reference to FIG. 1. Telematic device 204 includes components which are, in the illustration of FIG. 2, grouped logically into sensor interface components 210 and control components 220. No physical or spatial grouping of these components is necessary, but rather the grouping discussed herein is a logical delineation for ease of discussion.

Sensor interface 210 is shown as including a communication interface 212 configured to interface with matching port 202 in a vehicle (such as any of vehicles 120 in FIG. 1). In an exemplary implementation, port 202 is a diagnostic port (such as an OBDII port) of the vehicle, and communication interface 212 is a matching diagnostic port plug (such as a plug which fits in an OBDII port). Other forms and standards of ports and communication interfaces are possible, as appropriate for a given application. Data from the vehicle (such as sensor data from one or more sensors of the vehicle) is provided to sensor interface 210 of telematic device 204 via port 202 and communication interface 212.

Vehicle sensors can include, as non-limiting examples, a speed sensor, an inertial sensor, an RPM sensor, a fuel level sensor, a battery temperature sensor, an ambient temperature sensor, a battery voltage sensor, a battery charge sensor, a location sensor, and any other appropriate sensors which collect vehicle-related data.

Sensor interface 210 is also shown as including at least one sensor 214. In the illustrated example, two sensors 214 are illustrated, but any appropriate number of sensors could be included as appropriate for a given application. Data pertinent to the vehicle can be collected by sensors such as sensor 214. In this way, data can be collected which is not collected by sensors in the vehicle, or is not reported over an accessible port such as port 202. Sensors 214 could include, as non-limiting examples, a speed sensor, an inertial sensor, an ambient temperature sensor, a location sensor, an image sensor (e.g. camera), and any other appropriate sensors which collect vehicle-related data.

Sensor interface 210 is also shown as including a communication interface 216, which communicates with an optional peripheral device 290. Peripheral device 290 includes at least one sensor 292, and can provide data collected by the at least one sensor 292 to telematics device 204 via communication interface 216. In this way, data can be collected which is not collected by sensors in the vehicle, is not reported over an accessible port such as port 202, or is not collected by sensors in telematic device 204. The at least one sensor 292 could include, as non-limiting examples, a speed sensor, an inertial sensor, an ambient temperature sensor, a location sensor, an image sensor (e.g. camera), a fuel level sensor, and any other appropriate sensors which collect vehicle-related data.

Optionally, peripheral device 290 can also include at least one processor 294 and at least one non-transitory processor-readable storage medium 296. Peripheral device 290 can thus be used to perform acts of the methods discussed herein (by the at least one processor 294 executing processor-executable instructions stored at the at least one non-transitory processor-readable storage medium 296).

Communication interface 212 (and port 202), sensors 214, and communication interface 216 (and sensor 292) show multiple means by which telematics device 204 can collect sensor data. However, each of these components is not necessarily required. For example, any of communication interface 212, sensors 214, or communication interface 216 can be omitted, as long as one means of collecting sensor data remains.

Telematics device 204 can also include at least one processor 222 and at least one non-transitory processor-readable storage medium 224. Telematics device 204 can thus be used to perform acts of the methods discussed herein (by the at least one processor 222 executing processor-executable instructions stored at the at least one non-transitory processor-readable storage medium 224).

Telematic device 204 (optionally in combination with peripheral device 290) can be implemented, for example, as any of vehicle devices 122 in FIG. 1. Telematic device 204 (optionally in combination with peripheral device 290) can also be used in the context of any of the methods discussed herein (in particular, method 400 in FIG. 4).

As mentioned earlier, telematics device 204, in the form illustrated in FIG. 2, is not strictly required to implement the systems, methods, devices, and models discussed herein. In alternative implementations, the components of telematic device 204 can be integrated within a vehicle (namely, any appropriate sensors, processors, non-transitory processor-readable storage mediums, communication interfaces, etc.

can be components integrated in a vehicle, which serve similar functionality to telematic device 204.

As it regards particular sensor types and sensor data, several exemplary sensor types are of particular interest in this disclosure, and are discussed in detail below. The present disclosure is not limited to using data from these particular sensors (and several other sensor types are discussed above), nor is each of the particular sensors required in every implementation, but these particular sensors are called out as being especially valuable for the purposes discussed herein.

Any of the above discussed sensors or sensing modules (whether integrated in a vehicle or as part of a vehicle device or telematic device) can include a sensing module for determining vehicle location (also referred to as a location sensor). For instance, the sensing module may utilize Global Positioning System (GPS) technology (e.g., GPS receiver) for determining the geographic location (Lat/Long coordinates) of a vehicle. Alternatively, the sensing module utilizes another a global navigation satellite system (GNSS) technology, such as, GLONASS or BeiDou. Alternatively, the sensing module may further utilize another kind of technology for determining geographic location.

Alternatively, vehicle position information may be provided according to another geographic coordinate system, such as, Universal Transverse Mercator, Military Grid Reference System, or United States National Grid.

Any of the above discussed sensors or sensing modules can include a sensing module for determining an engine rotation speed for a vehicle (e.g. a tachometer). Engine rotation speed is typically expressed in revolutions per minute (RPM).

Any of the above discussed sensors or sensing modules can include a sensing module for determining movement speed for a vehicle. Vehicle movement speed can be expressed in any appropriate units, but is commonly expressed in miles per hour (mph), kilometers per hour (km/h), or meters per second (m/s). The speed sensor may be a sensor which measures data which is not directly movement speed of the vehicle, but is data from which movement speed of the vehicle can be derived. In some implementations, movement speed can be derived from location data measured by a location sensor (by determining change in location over time). In some implementations, movement speed can be derived from engine rotation speed data (based on a correlation in engine rotation speed and corresponding movement speed of the vehicle), or can be derived based on wheel rotation speed of the vehicle (which can itself be based on engine rotation speed, or measured by a specific wheel rotation speed sensor). For example, if wheels of a vehicle are of a known size, then distance travelled by the vehicle per wheel rotation (wheel circumference) is also known, such that a correlation can be established between time per wheel rotation and distance travelled per wheel rotation.

Any of the above discussed sensors or sensing modules can include a sensing module for determining acceleration of a vehicle, such as an accelerometer or IMU (inertial measurement unit).

Any of the above discussed sensors or sensing modules can include a fuel sensor or plurality of fuel sensors. Fuel sensors can be implemented and integrated within a vehicle. As a specific example, a fuel sensor can comprise a series of optical sensors positioned within a fuel tank of a vehicle. These optical sensors can detect the presence of fluid in front of the respective optical sensor. By positioning these optical sensors at specific heights in the fuel tank, fuel level can be measured by identifying which of the optical sensors have fluid in front, and which optical sensors do not. As another specific example, a float sensor could be integrated within a fuel tank of a vehicle. As yet another specific example, an ultrasonic fuel sensor can be positioned within a fuel tank of a vehicle. Fuel level as measured by such sensors can be reported to a vehicle control unit, and is used to inform a position of a fuel reading on a dashboard display of the vehicle. Further, such fuel data can also be reported over a diagnostic or communication interface of the vehicle (such as an OBDII port). A vehicle device (such as any of vehicle devices 122 or telematic device 204) can receive the fuel level data over the communication interface of the vehicle.

In other implementations, a fuel level sensor could be implemented which is not integrated with the vehicle. For example, a fuel level sensor could be implemented which communicates wirelessly with a vehicle device (e.g. as a peripheral device which communicates with telematic device 204). Such a fuel level sensor could be an optical or float sensor which is inserted into a vehicle fuel tank, as examples.

Figure 3:
FIG. 3 illustrates a calibration factor table, in accordance with at least one illustrated scenario.

FIG. 3 shows a table 300 which illustrates exemplary fuel amounts and calibration factors for a particular vehicle model. The left column shows amount of fuel volume remaining in a fuel tank of the vehicle. That is, the left column shows an actual amount of fuel in the fuel tank, expressed by volume. In this example, volume is expressed in liters (L), but volume could be expressed in any appropriate unit, such as gallons (gal). The middle column of table 300 shows measured fuel level for the vehicle, as measured by a fuel level sensor at a vehicle, and expressed as a percentage. The right column of table 300 shows a calibration factor, used for converting measured fuel level (in %) to fuel volume (in L in the example, but other units are possible). That is, by multiplying the measured fuel level by a corresponding calibration factor, a volume of fuel remaining can be determined, as shown in Equation (1) below.

$$V = f_l * c_f(f_l) \tag{1}$$

In Equation (1), V represents volume of fuel, $f_l$ represents measured fuel level, and $c_f(f_l)$ represents calibration factor corresponding to the measured fuel level.

Table 300 illustrates a limited number of rows (and thus a limited granularity of volume, fuel level, and calibration factors). In practice, more rows can be available for a given vehicle model to improve granularity of calibration factors. Alternatively or additionally, for a measured fuel level between the percentages shown, a calibration factor between those shown can be determined, as shown in Equation (2) below.

$$c_f(f_l) = c_f(f_l^-) + \frac{f_l - f_l^-}{f_l^+ - f_l^-} * (c_f(f_l^+) - c_f(f_l^-)) \tag{2}$$

In Equation (2), $f_l$ represents measured fuel level, $$f_l^+$$

represents a next represented fuel level above $f_l$, and $$f_l^-$$

represents a next represented fuel level below $f_l$. Further $c_f(f_l)$ represents calibration factor corresponding to the measured fuel level, $$c_f(f_l^+)$$

represents calibration factor corresponding to $$f_l^+,$$

$$c_f(f_l^-)$$

represents calibration factor corresponding to $$f_l^-.$$

That is, in Equation (2) a proportional ratio is determined between the closest (above and below) represented fuel levels, and this proportional ratio is multiplied by the difference between the closest (above and below) calibration factors, and added to the next lowest calibration factor. The result is an intermediate calibration factor which approximately corresponds to the measured fuel level.

In some implementations, alternate methodologies for determining an intermediate calibration factor could be applied. In some implementations, calibration factor can be modeled as an equation or fit trend. In other implementations, the nearest represented calibration factor could be applied, without determining an intermediate calibration factor.

However, Equations (1) and (2) above are limited to when measured fuel level is less than 100%. Commonly, a vehicle fuel tank can hold more fuel than a corresponding fuel level sensor can read. In the example of table 300, the fuel level sensor reports 100% fuel level when fuel volume is at 88.81 L. However, the fuel tank can actually hold up to 93 L. Throughout this disclosure, when referring to the actual capacity of a fuel tank, what is meant is the amount of fuel which the tank can hold before an ordinary fuel pump automatically stops filling (when a safety mechanism in the fuel pump "clicks" and stops output of fuel). In the example of FIG. 3, volume of fuel can range between 88.81 and 93 L and still be measured as 100%. As a result, when a fuel sensor measure fuel level is at 100%, the actual volume of fuel in the vehicle is uncertain. This region of fuel volume at and above 100% can be referred to as the "saturation region", where the fuel level sensor value is saturated and cannot measure higher values.

Table 300 illustrates one exemplary vehicle model, but fuel tank capacity in the saturation region can vary widely for other vehicle models. For example, some vehicle models have been measured to have at least 9 L of capacity in the saturation region.

In many scenarios, the available fuel tank capacity in the saturation region can have significant consequences. In the example of a vehicle rental or car share fleet, vehicle users are commonly expected to refill the vehicle fuel prior to returning the vehicle, and a staff member manually checks the fuel gauge of the vehicle to verify that fuel has been refilled. The fuel gauge is typically built into the vehicle and is based on the fuel level as measured by the fuel level sensor, and thus does not account for the saturation region. In some cases, a saavy user may be aware of the extra fuel capacity in the saturation region, and may only refill the vehicle to a point where the fuel gauge will still display 100%, but with at least a portion of the saturation region empty. This effectively pushes the cost of the empty portion of the saturation region onto the vehicle rental company, or onto a subsequent user. Additionally, even if not deliberate, a user may refill the vehicle at a fuel location very distant from a return location of the vehicle, such that a notable amount of fuel is consumed travelling to the return location. This consumed fuel may not be represented by the fuel gauge, and thus effectively the cost of the empty portion of the saturation region is pushed onto the vehicle company or onto a subsequent user.

It is desirable to be able to detect actual volume of fuel in the fuel tank, accounting for the saturation region, at least to accurately distribute costs according to who is responsible for fuel usage.

Figure 4:
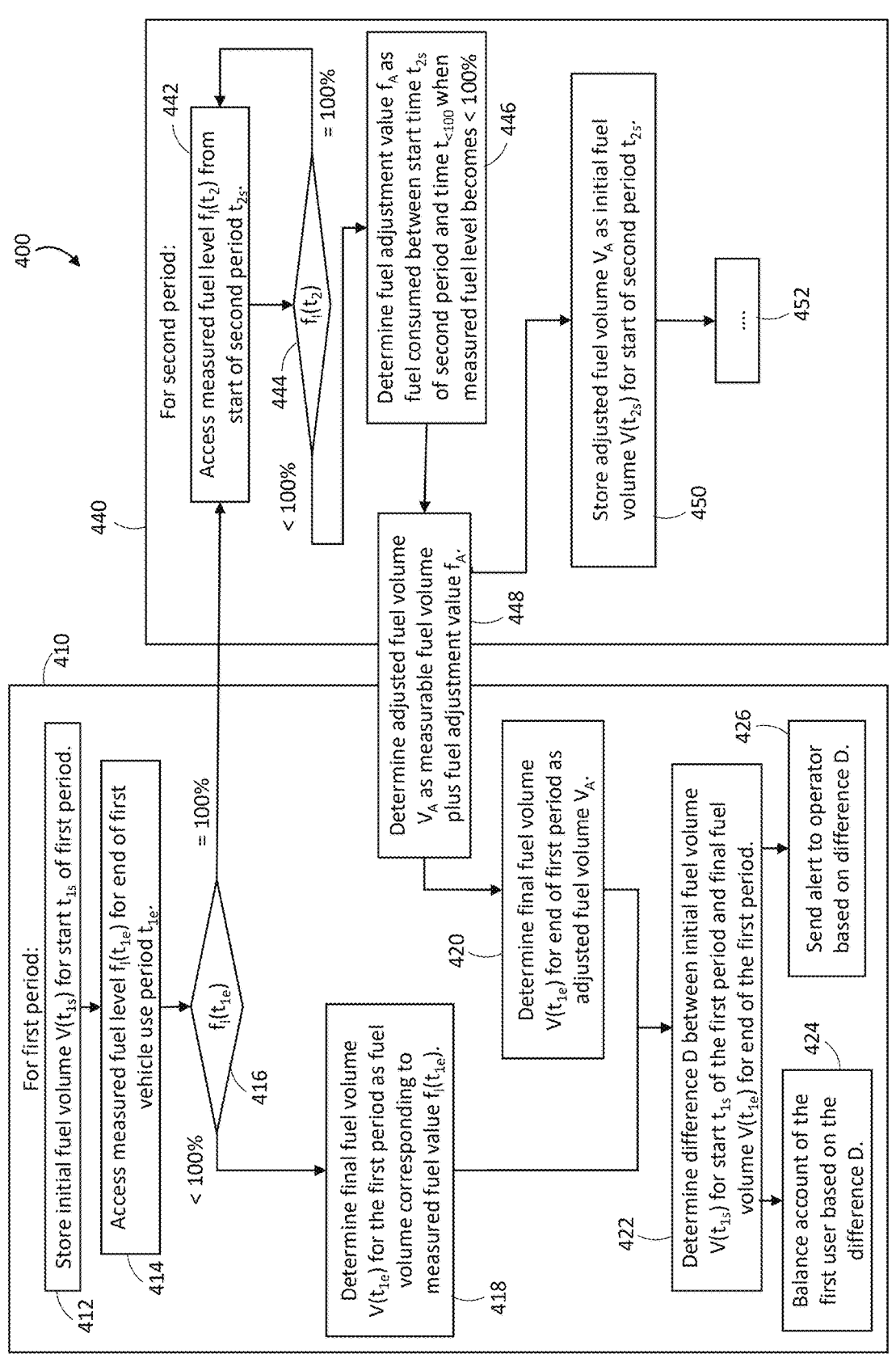
FIG. 4 is a flowchart diagram which illustrates an exemplary method for determining fuel level.

FIG. 4 is a flowchart diagram which illustrates an exemplary method 400 for determining fuel level of a vehicle and determining difference between initial and final fuel levels of the vehicle over a time period. Method 400 as illustrated includes acts 412, 414, 416, 418, 420, 422, 424, and 426 performed for a first time period (grouped as 410), and acts 442, 444, 446, 450, and 452 performed for a second time period (grouped as 440), and act 448 performed for the first time period and the second time period. Acts being performed "for" a time period mean they are pertinent to the time period, but does not require that they be performed within the time period (though they can be), as will be discussed later. One skilled in the art will appreciate that additional acts could be added, acts could be removed, or acts could be reordered as appropriate for a given application. For example, act 450 can be optional or omitted from the scope of the method. As another example, acts 424 and 426 can be alternatives to each other, or could be omitted in favor of a different act. With reference to the example illustrated in FIG. 1, acts can be performed by appropriate components of management device 110, vehicle devices 122, or optional device 130. For example, acts of identification, determination, generation, or general data manipulation can be performed by at least one appropriate processor (e.g. processors 114, 124, 134, 222, or 294). Further, any of the at least one non-transitory processor-readable storage mediums 116, 126, or 136 could have instructions stored thereon, which when executed by a respective at least one processor (processors 114, 124, 134, 222, or 294) cause the respective management device 110, vehicle device 122, or optional device 130 to perform a given act of method 400. An act being performed by at least one processor 124 refers to the act being performed by any of processors 124a, 124b, 124c, or 124d. An act being performed by at least one non-transitory processor-readable storage medium 126 refers to the act being performed by any of non-transitory processor-readable storage mediums 126a, 126b, 126c, or 126d. An act being performed by communication interface 128 refers to the act being performed by any of communication interfaces 128a, 128b, 128c, or 128d. Typically, for a combination of acts performed by a combination of at least one processor, at least one non-transitory processor-readable storage medium, and a communication interface of a vehicle device, the combination of acts are performed by at least one processor, at least one non-transitory processor-readable storage medium, and a communication interface common to one of vehicle devices 122a, 122b, 122c, or 122d (or any other similar vehicle device). Generally speaking, in the context of method 400 acts of identification and determination are performed by at least one processor (e.g. any of processors 114, 124, 134, 222, or 294). Thus, reference to an act of identifying or determining being performed by a particular device generally refers to the act being performed by at least one processor of the device.

Method 400 is directed to an example where a vehicle is used for a first period by a user (e.g. rented by the user), and is subsequently used by another user for a second period. The first period and the second period could be referred to as respective vehicle use periods. Acts performed during or pertinent to the first period are grouped as 410, and acts performed during or pertinent to the second period are grouped as 440. This grouping is not strictly limiting, as some acts are pertinent to both periods. The first and second periods represent subsequent periods of vehicle use, and can correspond to two periods out of any number of periods when a vehicle is used many different times. Further, in method 400 data accessed in the second period is used to determine fuel level for the first period; likewise, in a subsequent iteration of method 400 the previous "second period" can become the next "first period", and a subsequent "third period" could be treated as the next "second period" for the subsequent iteration of method 400.

Throughout the discussion of method 400 in FIG. 4, a variety of symbols are used to express different values and concepts, as follows:

$f_l$: measured fuel level (by a fuel level sensor, as %)

t: time $V(t,f_l)$: fuel volume (e.g. L or gal) at a time t and fuel level $f_l$ $c_f(f_l)$: calibration factors as a function of fuel level $f_l$ (as discussed above regarding FIG. 3)

$V_{max}$: fuel volume at maximum fuel sensor reading of 100% (88.81 L in the example of FIG. 3)

$f_c(t)$: fuel consumed, as a function of time t $t_{1s}$: start time of first period $t_{1e}$: end time of first period $t_{2s}$: start time of second period $t_{<100}$: time where $f_l$ is measured as less than 100%

$f_l(t_{1s})$: initial measured fuel level (%) for start of first period $t_{1s}$ $f_l(t_{1e})$: end measured fuel level (%) for end of first period $t_{1e}$ $f_l(t_2)$: measured fuel level (%) for second period $V(t_{1s})$: initial fuel volume for start of first period $t_{1s}$ $V(t_{1e})$: end fuel volume for end of first period $t_{1e}$ $V(t_{2s})$: initial fuel volume for start of second period $t_{2s}$ $f_A$=fuel adjustment value $V_A$=adjusted fuel volume accounting for saturation region At 412, initial fuel volume $V(t_{1s})$ for the start $t_{1s}$ of the first period is stored. For example, initial fuel volume $V(t_{1s})$ can be a final fuel volume as determined for a period which precedes the first period. This is discussed in more detail later with reference to act 450. Storing the initial fuel volume $V(t_{1s})$ can comprise storing by at least one non-transitory processor-readable storage medium (such as medium 116) an indication the initial fuel volume $V(t_{1s})$, for comparison later when the vehicle is returned.

After 412, the user utilizes the vehicle, and eventually returns the vehicle, ending the first period at approximately 414 (e.g. coincident with or shortly before 414). At 414, measured fuel level $f_i(t_{1e})$ for end of first vehicle use period $t_{1e}$ is accessed. For example, act 414 could comprise capturing measured fuel level $f_i(t_{1e})$ by a fuel sensor at the vehicle. As another example, act 414 could comprise receiving measured fuel level $f_i(t_{1e})$ as transmitted from a communication interface at the vehicle (e.g. from a communication interface 128 to communication interface 118). As yet another example, act 414 could comprise accessing measured fuel level $f_i(t_{1e})$ from a non-transitory processor-readable storage medium (such as medium 116) where measured fuel level $f_i(t_{1e})$ is stored (for example if act 414 is performed some time after the end of the first period).

At 416, at least one processor (e.g. the at least one processor 114, 124, or 134) determines whether measured fuel level $f_i(t_{1e})$ is less than 100%, or is 100%.

If measured fuel level $f_i(t_{1e})$ is less than 100% at 416, then fuel volume is accurately determinable from measured fuel level $f_i(t_{1e})$, and method 400 proceeds to act 418. At 418, the at least one processor determines final fuel volume $V(t_{1e})$ for the first period as fuel volume corresponding to measured fuel value $f_i(t_{1e})$. For example, the at least one processor can multiply measured fuel level $f_i(t_{1e})$ by an appropriate calibration factor $c_f(f_i(t_{1e}))$, as discussed earlier with reference to FIG. 3.

If measured fuel level $f_i(t_{1e})$ is 100% at 416, then fuel volume is not accurately determinable from measured fuel level $f_i(t_{1e})$, since fuel volume could be anywhere in the saturation region. To accurately estimate final fuel volume, method 400 proceeds to 442.

At 442, measured fuel level $f_i(t_2)$ from start of second period $t_{2s}$ is accessed. For example, act 442 could comprise capturing measured fuel level $f_i(t_2)$ by a fuel sensor at the vehicle. As another example, act 442 could comprise receiving measured fuel level $f_i(t_2)$ as transmitted from a communication interface at the vehicle (e.g. from a communication interface 128 to communication interface 118). As yet another example, act 414 could comprise accessing measured fuel level $f_i(t_2)$ from a non-transitory processor-readable storage medium (such as medium 116) where measured fuel level $f_i(t_2)$ is stored (for example if act 442 is performed with some delay after collection and/or transmission of measured fuel level data).

At 444, the at least one processor determines whether measured fuel level $f_i(t_2)$ is 100%, or is less than 100%. If measured fuel level $f_i(t_2)$ is 100%, then the at least one processor continues to monitor accessed measured fuel level $f_i(t_2)$ over time. If measured fuel level $f_i(t_2)$ is less than 100%, then method 400 proceeds to act 446. In this sense, the measured fuel level $f_i(t_2)$ from start of second period $t_{2s}$ accessed at 442 is not necessarily measured fuel level for a particular moment in time, but rather represents fuel level as measured over a length of time, in particular from a start time $t_{2s}$ of the second period until a time $t_{<100}$ when measured fuel level $f_i(t_2)$ becomes less than 100%.

Once measured fuel level $f_i(t_2)$ has become less than 100%, fuel volume is accurately determinable therefrom. In particular, the moment ($t_{<100}$) that measured fuel level goes from 100% to less than 100%, fuel volume in the fuel tank of the vehicle is nearly $V_{max}$ (the maximum volume of fuel measurable by the fuel volume sensor). In the example of FIG. 3, $V_{max}$ is nearly 88.81 L.

At 446, fuel consumption is utilized to work backwards and determine fuel volume at the beginning of the second period. In particular, a fuel adjustment value $f_A$ is determined by the at least one processor. The fuel adjustment value $f_A$ represents fuel consumed between start time $t_{2s}$ of the second period and time $t_{<100}$ when measured fuel level becomes less than 100%, based on a fuel consumption rate of the vehicle. Fuel adjustment value $f_A$ can be determined in several different ways such as the exemplary implementations discussed below.

In a first exemplary implementation, fuel consumption data is collected by a telematics device. In particular, many modern vehicles generate and output a fuel consumption signal, and this fuel consumption signal can be collected by a telematics device (e.g. telematics device 204 in FIG. 2 can read the fuel consumption signal from the vehicle via communication interface 212).

In an example, the fuel consumption signal is provided as a measure of fuel consumed correlated with time, such as liters consumed per minute, or any other appropriate volume or time units. Further, a fuel consumption signal can be output regularly (e.g. every second, or any other appropriate interval). A plurality of instants of the fuel consumption signal can be collectively referred to as fuel consumption data, and fuel consumed between start time $t_{2s}$ of the second period and time $t_{<100}$ can be determined by the at least one processor accumulating the fuel consumption data between $t_{2s}$ and $t_{<100}$. In this example, accumulating the fuel consumption data between $t_{2s}$ and $t_{<100}$ can comprise integrating the fuel consumption data over the time span between $t_{2s}$ and $t_{<100}$, which results in a total volume of fuel consumed between $t_{2s}$ and $t_{<100}$ (and thus is the fuel adjustment factor $f_A$).

In another example, the fuel consumption signal is provided as a measure of fuel consumed correlated with distance travelled, such as liters consumed per 100 km (L/100 km) or miles travelled per gallon (MPG). As in the above example, a fuel consumption signal can be output regularly (e.g. every second, or any other appropriate interval). A plurality of instants of the fuel consumption signal can be collectively referred to as fuel consumption data, and fuel consumed between start time $t_{2s}$ of the second period and time $t_{<100}$ can be determined by the at least one processor accumulating the fuel consumption data between $t_{2s}$ and $t_{<100}$. In this example, because fuel consumption is correlated to distance (as opposed to time), accumulating the fuel consumption data between $t_{2s}$ and $t_{<100}$ can comprise evaluating the fuel consumption data over distance travelled in the time span between $t_{2s}$ and $t_{<100}$. In this regard, location data can be accessed for the time between $t_{2s}$ and $t_{<100}$. For example the location data can be collected by a location sensor at the vehicle or in telematics device 204, and transmitted to management server 110 via communication interfaces 128 and 118, or the location data could be accessed from storage at a non-transitory processor-readable storage medium such as medium 116. The at least one processor can correlate data points of fuel consumption data with data points of the location data, to determine distance travelled corresponding to data points of fuel consumption data. The distance travelled and corresponding fuel consumption data can be evaluated to determine volume of fuel consumed (e.g. L/100 km values can be multiplied by km values travelled and divided by 100 to determine Liters consumed; miles travelled can be divided by MPG values to determine Gallons consumed). The determined volume of fuel consumed is the fuel adjustment value $f_A$. Alternatively, the at least one processor can determine total distance travelled in the time between $t_{2s}$ and $t_{<100}$, and can determine an average fuel consumption rate in the time between $t_{2s}$ and $t_{<100}$. The average fuel consumption rate can be weighted, to account for differing fuel consumption rates for different quantities of time between $t_{2s}$ and $t_{<100}$. The total distance travelled can then be evaluated with the average fuel consumption rate to determine volume of fuel consumed (e.g. and average L/100 km value can be multiplied by total km travelled value and divided by 100 to determine Liters consumed; total miles travelled can be divided by average MPG value to determine Gallons consumed). The determined volume of fuel consumed is the fuel adjustment value $f_A$.

In a second exemplary implementation, a fuel consumption rate signal is not output by the vehicle. In such a case, alternative signals may be output, such as manifold pressure, mass airflow, fuel injection quantity, etc. A fuel consumption rate or volume can be derived from these signals (e.g. by at least one processor 222 of telematics device 204, or at least one processor 114 of management device 110). Such a derived fuel consumption rate can be utilized to determine the fuel adjustment amount similarly to as discussed in the first exemplary implementation above.

In a third exemplary implementation, a fuel consumption rate signal is not output by the vehicle. Instead, a nominal fuel consumption rate can be used to estimate the fuel adjustment factor $f_A$. For example, vehicles are commonly distributed with or advertised with expected fuel consumption rates (usually referred to as fuel efficiency values). Such fuel consumption rates are typically a measure of fuel consumed correlated with distance travelled, such as liters consumed per 100 km (L/100 km) or miles travelled per gallon (MPG). Similarly to as discussed in the first exemplary implementation above, location data can be accessed for the time between $t_{2s}$ and $t_{<100}$. For example the location data can be collected by a location sensor at the vehicle or in telematics device 204, and transmitted to management server 110 via communication interfaces 128 and 118, or the location data could be accessed from storage at a non-transitory processor-readable storage medium such as medium 116. The at least one processor can determine total distance travelled in the time between $t_{2s}$ and $t_{<100}$. The total distance travelled can then be evaluated with the nominal fuel consumption rate to determine volume of fuel consumed (e.g. a L/100 km value can be multiplied by total km travelled value and divided by 100 to determine Liters consumed; total miles travelled can be divided by an MPG value to determine Gallons consumed). The determined volume of fuel consumed is the fuel adjustment value $f_A$.

In many cases, separate fuel consumption rates are advertised for "highway" vs "city" driving. In such cases accuracy of the determined fuel adjustment $f_A$ can be improved by applying the most appropriate fuel consumption rate. For example, based on location data for the vehicle (collected as discussed above), the at least one processor could determine whether the vehicle is in a city or on the highway (e.g. based on geofencing or zones), and evaluate distance travelled while in the city against the nominal "city" fuel consumption rate, and evaluate distance travelled while in on the highway against the nominal "highway" fuel consumption rate. As another example, based on speed data for the vehicle (collected by a telematics device as discussed above), the at least one processor could determine whether the vehicle is travelling at "city" speeds or are "highway" speeds, for example by comparing the speed of the vehicle to a speed threshold such as 70 km/h, where "highway" speed is 70 km/h and above, and "city" speed is less than 70 km/h. The threshold of 70 km/h is merely exemplary, and any appropriate threshold could be utilized as appropriate for a given application. The at least one processor can then evaluate distance travelled at city speeds against the nominal "city" fuel consumption rate, and evaluate distance travelled at highway speeds against the nominal "highway" fuel consumption rate.

In a fourth exemplary implementation, a lifetime fuel consumption accumulator is maintained for the vehicle. That is, fuel consumption by the vehicle over time is aggregated and stored, much like how an odometer is aggregated indicating lifetime distance travelled by the vehicle. In some cases, the vehicle itself maintains this accumulator; in other cases based on fuel consumption data an external device (such as vehicle device 122, telematics device 204, or management server 110) can aggregate fuel consumption data over time for the vehicle to store a lifetime fuel consumption value, trend, or dataset. In implementations where data indicating lifetime fuel consumption $f_{lifetime}(t)$ by the vehicle is available, the fuel adjustment value $f_A$ can be determined by subtracting the lifetime fuel consumed value at the start $t_{2s}$ of the second period from lifetime fuel consumed when measured fuel level becomes less than 100 at $t_{<100}$. This is shown in Equation (3) below:

$$f_A = f_{lifetime}(t_{<100}) - f_{lifetime}(t_{2s}) \tag{3}$$

After fuel adjustment value $f_A$ is determined at 446 by any of the implementations discussed above (or any other appropriate implementations), method 400 proceeds to 448.

At 448, the at least one processor determines adjusted fuel volume $V_A$. In an exemplary implementation, adjusted fuel volume is determined as fuel tank measurable capacity $V_{max}$ plus fuel adjustment value $f_A$. This is shown in Equation (4) below:

$$V_A = V_{max} + f_A \tag{4}$$

Such an implementation is useful where $V_{max}$ accurately represents fuel level at time $t_{<100}$. For example, for a fuel sensor which measures fuel level with significant granularity (e.g. fuel level at time $t_{<100}$ is measured as 99.9%), then $V_{max}$ is a close approximation of fuel volume at $t_{<100}$. As another example, in some cases fuel level and fuel volume data (such as table 300 in FIG. 3) can be configured or calibrated such that $V_{max}$ represents the highest fuel volume measurable outside the saturation region (e.g. corresponds to the highest fuel level which is less than 100%). In such cases $V_{max}$ itself represents fuel volume at $t_{<100}$.

In an alternative implementation, adjusted fuel volume $V_A$ is determined as fuel volume $V_{<100}$ corresponding to measured fuel level at $t_{<100}$ plus fuel adjustment value $f_A$. Equation (5) below shows determination of fuel volume $V_{100}$ based on Equation (1) discussed earlier. Equation (6) below shows determination of adjusted fuel volume $V_A$ based on $V_{<100}$ and fuel level $f_l(t_{<100})$ for time $t_{<100}$:

$$V_{<100} = f_l(t_{<100}) * c_f(f_l(t_{<100})) \tag{5}$$

$$V_A = V_{<100} + f_A \tag{6}$$

Thus, at 448, an accurate measure of the actual fuel volume in the fuel tank is determined, accounting for the saturation region above the measurable capacity of the fuel tank.

At 420, the at least one processor determines final fuel volume $V(t_{1_e})$ for the first period as the adjusted fuel volume $V_A$.

As a result of method 400 up to this point, final fuel volume $V(t_{1_e})$ for the first period is determined as either fuel volume corresponding to measured fuel value $f_i(t_{1_e})$ as in act 418, or as adjusted fuel volume $V_A$ as in act 420. Thus, method 400 illustrates that depending on the measured fuel level of the vehicle $f_i(t_{1_e})$ for the end of the first period, data for the second period can be relied on to account for the saturation region of the fuel tank if necessary. Based on the final fuel volume $V(t_{1_e})$ determine at 418 or 420, account rectification is triggered for example as discussed below with reference to acts 422, 424, and 426.

At 422, a difference D is determined by the at least one processor (e.g. processor 114, 124, or 134) between initial fuel volume $V(t_{1_s})$ for start $t_{1_s}$ of the first period and final fuel volume $V(t_{1_e})$ for end of the first period. In the context of a vehicle rental, the difference D indicates whether and to what extent the user has adequately, inadequately, more than adequately refueled the vehicle. This difference D can be actioned in any appropriate way, with several examples discussed below.

In the example shown at 424, an account of the first user is automatically balanced based on the difference D. For the example, the at least one processor can access the account of the first user could be a credit account, and funds commensurate with (based on a price of fuel) the difference D can be charged, credited to, or debited from the account.

In the example shown at 426, a system operator can be sent an alert or notification to take action (to rectify an associated account) based on the difference D (several examples are discussed in detail later with reference to FIGS. 5, 6, 7, and 8). In some cases, if difference D is non-zero, the operator can be sent an alert to address the difference. For example, the operator could credit or debit the first user, send an invoice or remittance statement to the first user, or take any other appropriate action. In some cases, before sending the alert to the operator, the at least one processor can compare the difference D to a threshold, to ascertain whether difference D is worthy of attention. For example, if difference D is less than one dollar, the at least one processor can determine that difference D is not significant enough to warrant attention, and can take no action. On the other hand, if the difference D is greater than one dollar, the at least one processor can determine that corrective action needs to be taken. Such an implementation is advantageous where transaction and/or communication fees are high (e.g. banking fees, or the labor cost of having the operator address difference D may be too high to make recovering the difference D worthwhile). The threshold of one dollar is merely exemplary, and any threshold could be used as appropriate for a given application.

Any means of handling difference D can be implemented as appropriate for a given implementation or scenario, and method 400 is not limited to the examples discussed above.

At 450, the adjusted fuel volume $V_A$ is stored (e.g. at the non-transitory processor-readable storage medium 116) as the initial fuel volume $V(t_{2_s})$ for the start $t_{2_s}$ of the second period. This initial fuel volume $V(t_{2_s})$ can be used for determining a difference between initial fuel volume and final fuel volume when the second period ends, similar to as discussed in act 422 for the first period. Box 452 in FIG. 4 shows that additional acts can be included for the second period, such as determining such a difference, and taking appropriate action based thereon.

As mentioned earlier, act 412 entails storing initial fuel volume $V(t_{1_s})$ for the start $t_{1_s}$ of the first period. Similarly to act 450, act 412 can include storing an adjusted fuel volume as determined for a period which precedes the first period.

Method 400 can be implemented across devices in different ways; that is, different devices can perform portions of method 400 as appropriate for a given application. Several exemplary implementations are discussed below, but one skilled in the art will understand that these are merely examples, and acts of method 400 can be portioned to different devices as appropriate for a given application.

In a first exemplary implementation, method 400 is performed as much as possible at a management device (such as management device 110). In this example, acts 414, 416, 418, 420, 422, 424, 426, 442, 444, 446, 448, and 452 can be performed (at least in part) by at least one processor of the management device (e.g. processor 114). Acts 412 and 450 can be performed by at least one non-transitory processor-readable storage medium of the of management device (e.g. non-transitory processor-readable storage medium 116). As another example, acts 414 and 442 could comprise the processor 114 accessing the respective data from medium 116. As yet another example, acts 414 and 442 could comprise a communication interface (e.g. communication interface 118) of the management device receiving the respective data. As yet another example, acts 424 could be performed in concert with a device where monetary transactions occur (e.g. a banking server); for example act 424 could be performed by a communication interface (e.g. communication interface 118) of the management device transmitted transaction details to the banking server. As yet another example, act 426 could comprise transmitting the alert via a communication interface of the management device (e.g. communication interface 118). As yet another example, act 426 could comprise outputting the alert via an output device (as discussed later with reference to FIGS. 5, 6, 7, and 8).

In a second exemplary implementation, method 400 is performed in part by a management device (such as management device 110) and by a vehicle device (such as vehicle device 122 or telematics device 204, or a peripheral device 290). In this example, acts 414, 416, 418, 420, 422, 424, 426, 446, 448, and 452 can be performed (at least in part) by at least one processor of the management device (e.g. processor 114). Acts 442 and 444 can be performed by at least one processor of the vehicle device (e.g. any of processors 124, 222, or 294). In this example, the at least one processor at the vehicle monitors measured fuel level at the vehicle in acts 442 and 444, and reports to the management device when measured fuel level drops below 100% at 444 (e.g. sends a transmission to the management device 110 via communication interfaces 128, 226, 216 and/or 118, as appropriate for a given application). Acts 412 and 450 can be performed by at least one non-transitory processor-readable storage medium of the of management device (e.g. non-transitory processor-readable storage medium 116). As another example, acts 414 and 442 could comprise the processor (114, 124, 222, or 294) accessing the respective data from a corresponding non-transitory processor-readable storage medium (e.g. 116, 126, 224, or 296). As yet another example, act 414 could comprise a communication interface (e.g. communication interface 118) of the management device receiving the respective data. As yet another example, acts 424 could be performed in concert with a device where monetary transactions occur (e.g. a banking server); for example act 424 could be performed by a communication interface (e.g. communication interface 118)

of the management device transmitted transaction details to the banking server. As yet another example, act 426 could comprise transmitting the alert via a communication interface of the management device (e.g. communication interface 118). As yet another example, act 426 could comprise outputting the alert via an output device (as discussed later with reference to FIGS. 5, 6, 7, and 8).

Figure 5:
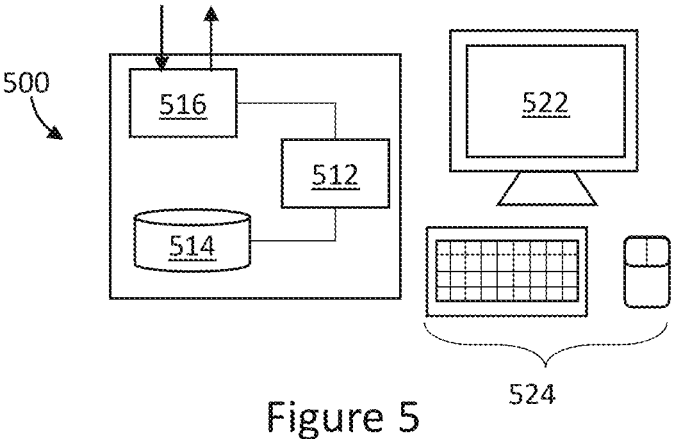
FIG. 5 is a schematic diagram showing an exemplary device for presenting a user interface.

FIG. 5 is a schematic view of an operator device 500, which could be used for vehicle management and used in any of the implementations discussed herein, and in particular is useful for presenting information or alerts to an operator (such as in FIGS. 6, 7, and 8 discussed below). For example, device 500 could be used as management device 110 or optional device 130 in FIG. 1, or as a user interface device to provide input to or present output from these devices. Device 500 as illustrated includes at least one processor 512, at least one non-transitory processor-readable storage medium 514, and a communication interface 516. The non-transitory processor-readable storage medium 514 can have processor-readable instructions stored thereon which, when executed by the at least one processor 512 cause the device 500 to perform appropriate operations (such as presenting output or alerts as discussed below with reference to FIGS. 6, 7, and 8). Communication interface 516 can be a wired or wireless interface, through which data and inputs can be provided to device 500, and through which data and outputs can be provided by device 500.

FIG. 5 also illustrates exemplary input and output devices through which a user or operator can interact with device 500. In particular, FIG. 5 shows a display 522, which can display outputs from device 500. Other output devices could be provided such as speakers, or any other appropriate output device. FIG. 5 also shows a keyboard and mouse 524, which can be used to provide inputs to the device 500. Other input devices could also be used, such as a touchscreen, microphone, trackpad, or any other appropriate input device. Although the input and output devices illustrated in FIG. 5 appear in the form of those used with a desktop computer, other forms of devices could also be used, such as portable devices like a laptop, smartphone, PDA, tablet, or any other appropriate device. Further, a device to which a user provides input and receives output can be remote from the device 500. For example, the device including the at least one processor 512, the at least one non-transitory processor-readable storage medium 514, and the communication interface 516 can be a server, which is remote from a workstation or device with which the user interacts.

Figure 6:
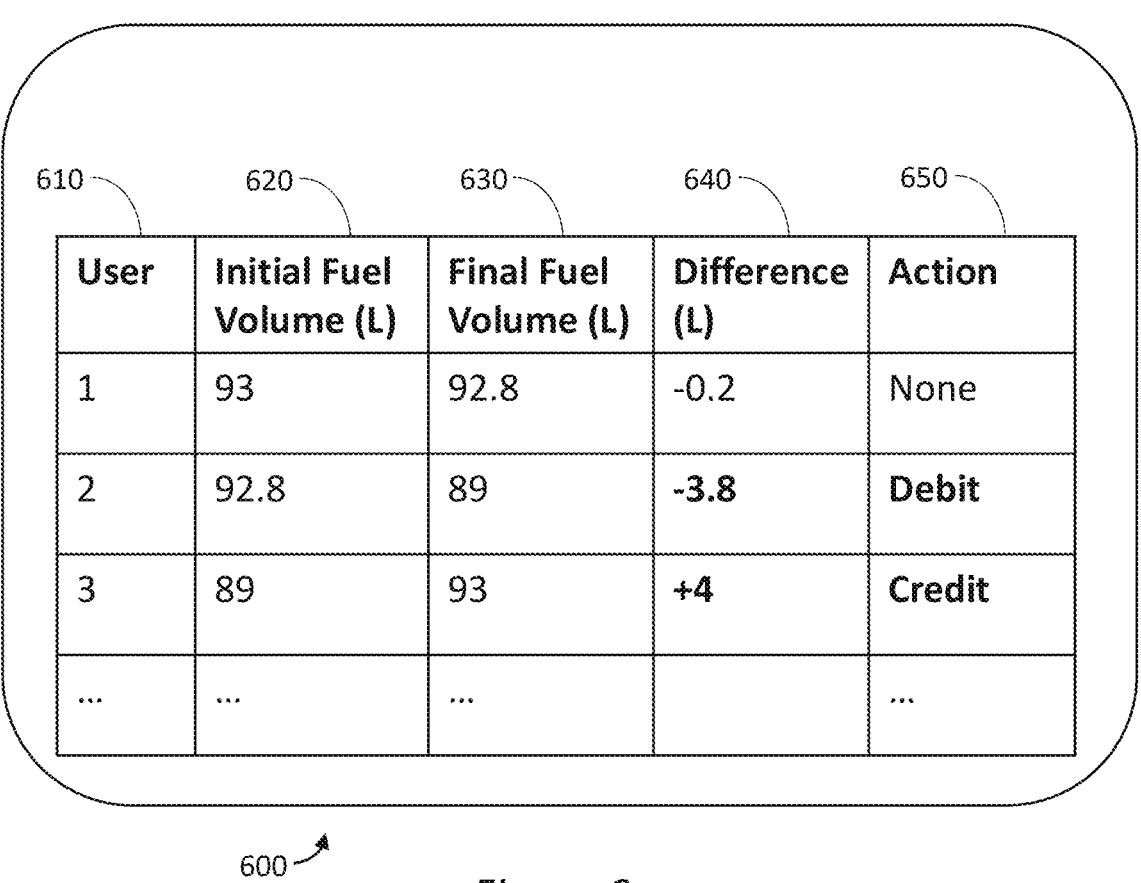
FIGS. 6, 7, and 8 illustrate exemplary user interfaces for presenting fuel-related information, in accordance with at least three illustrated implementations.
Figures 7, 8:
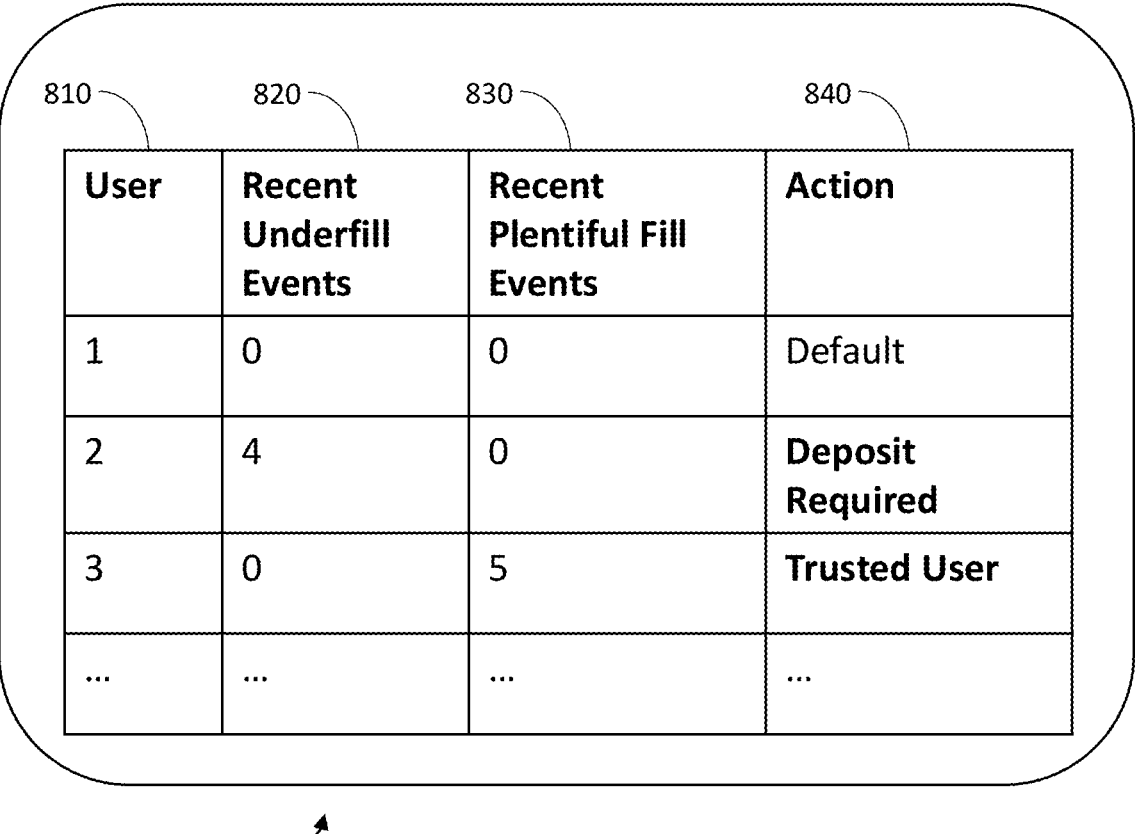

FIGS. 6, 7, and 8 illustrate exemplary user interfaces, which show respective exemplary outputs 600, 702, 704, and 800 from a management device. For example, the user interfaces of FIGS. 6, 7, and 8 can be presented via a display of management device 110, or via a display of a device communicatively coupled to management device 110 (such as user terminal, or optional device 130), such as shown in FIG. 5. In a particular scenario, the user interfaces in FIGS. 6, 7, and 8 are useful for managing a plurality of rental vehicles. A vehicle is rented to a customer with a stored initial fuel level (e.g. as stored in acts 412 and 450 of method 400), and the customer is expected to refill the vehicle fuel prior to returning the vehicle. The Interfaces of FIGS. 6, 7, and 8 are useful for identifying whether a vehicle has been refueled an appropriate amount.

The user interface of FIG. 6 is shown as including an output table 600 including 5 columns 610, 620, 630, 640, and 650. The output table 600 can for example for generated and presented to an operator as a report, so that the operator can take appropriate action where needed. Column 610 shows a list of users (labeled by number as Users 1, 2, and 3 in the example, but other labels could be used). Column 620 shows a stored initial fuel volume for when the vehicle was taken out (start of rental period). Column 630 shows a final fuel volume for when the vehicle was returned (end of rental period), as determined in accordance with method 400. Column 640 shows a difference between the initial fuel volume and the final fuel volume, determined in accordance with act 422 in method 400. Column 650 shows an indication of an action to be taken.

User 1 in output table 600 rented the vehicle with an initial fuel volume of 93 L, and returned the vehicle with a final fuel volume of 92.8 L, the difference being −0.2 L. Column 650 shows that the action to be taken with regards to User 1 is "None". This example illustrates a case where the at least one processor determines whether the difference exceeds a threshold in order to determine whether action needs to be taken. The difference of −0.2 L is below such a threshold, such that no action needs to be taken.

User 2 in output table 600 rented the vehicle with an initial fuel volume of 92.8 L (the final fuel volume from User 1), and returned the vehicle with a final fuel volume of 89 L, the difference being −3.8 L. Column 650 shows that the action to be taken with regards to User 2 is "Debit". This example illustrates that the difference is significant enough such that corrective action should be taken; in this case, the user 2 needs to be debited for the difference (3.8 L times the fuel price). The operator's attention can be expressly drawn to this action item, for example by highlighting the action as illustrated in bold, or by a dedicated alert such as those discussed later with reference to FIG. 7.

User 3 in output table 600 rented the vehicle with an initial fuel volume of 89 L (the final fuel volume from User 2), and returned the vehicle with a final fuel volume of 93 L, the difference being +4 L. Column 650 shows that the action to be taken with regards to User 3 is "Credit". This example illustrates that the difference is significant enough such that corrective action should be taken; in this case, the user 3 needs to be credited for the difference (4 L times the fuel price). The operator's attention can be expressly drawn to this action item, for example by highlighting the action as illustrated in bold, or by a dedicated alert such as those discussed later with reference to FIG. 7.

The example of FIG. 6 illustrates the effectiveness of method 400. In particular, with reference to the example vehicle in FIG. 3, all of the initial fuel volumes and final fuel volumes shown in output table 600 are within the saturation region (the measured fuel level would show 100% for all of the initial fuel volumes and final fuel volumes shown in FIG. 6). However, User 2 did not adequately refuel the vehicle, whereas User 3 completely refueled the vehicle. Absent the use of method 400, User 3 would be burdened with the cost of the fuel which User 2 used but did not refuel. Thanks to method 400, however, fuel usage can be accurately attributed and billed to the correct users.

FIG. 7 shows exemplary alerts which can be sent to the operator, in view of determined differences in fuel volumes as discussed with reference to FIG. 6. In particular, an alert 702 is sent or presented to the operator, which instructs the operator to debit User 2 for 3.8 L. Similarly, alert 704 is sent or presented to the operator, which instructs the operator to credit User 3 for 4 L. The alerts in FIG. 7 advantageously provide a streamlined way to an operator to take action where needed, and result in time savings.

FIG. 8 shows an exemplary user interface, which includes an output table 800 including 4 columns 810, 820, 830, and 840. The output table 800 can for example for generated and presented to an operator as a report, so that the operator can take appropriate action where needed. Column 810 shows a list of users similar to as in FIG. 6 (labeled by number as Users 1, 2, and 3 in the example, but other labels could be used). Column 820 shows a number of recent underfill events by each user. An "underfill event" refers to a situation where a user returned a vehicle with a significant negative difference in fuel (final fuel volume is significantly less than initial fuel volume). The threshold for what qualifies as significant could for example be the same threshold as for determining whether a user should be credited or debited for the difference. Alternatively, the threshold for what qualifies as significant could be different (e.g. higher) compared to the threshold for determining whether a user should be credited or debited for the difference. Further, what qualifies as "recent" could be set as appropriate for a given application. For example, "recent" could be a period of time, such as six months, one year, or any other appropriate amount of time. As another example, "recent" could be a number of rentals, such as the previous ten rentals, or any other appropriate amount of rentals. Column 830 shows a number of recent plentiful fill events by each user. A "plentiful fill event" refers to a situation where a user returned a vehicle with a significant positive difference in fuel (final fuel volume is significantly more than initial fuel volume), with the discussion of thresholds for underfill events also being applicable to plentiful fill events.

Column 840 shows an action to be taken for each user. In the context of FIG. 8, the actions to be taken refer to actions taken at the time of renting out or providing a vehicle to the user. The actions essentially reward users who tend to ensure the vehicle is fully refueled, and take precautions with users who tend to underfill the vehicle. For User 1, who has no recent underfill and no recent plentiful fill events, default action is taken. What is meant by "default action" can be set as appropriate for a given application, but generally can refer to a standard operating procedure or trust level when renting the vehicle to the user. For User 2, who has 4 recent underfill events and no recent plentiful fill events, a more cautious approach is to be taken, with a deposit being required. This deposit can be used to compensate for underfill events, which User 2 has a habit of doing. For User 3 who has no recent underfill events and 5 recent plentiful fill events, a trusting approach is taken, since User 3 has a history of ensuring the vehicle is fully refueled. Such a trusting approach could for example entail waiving of a refueling deposit, or offering other perks such as free upgrades or options.

The specific amounts of underfill and plentiful fill events required to trigger any specific action are merely exemplary, and could be different in other applications. Further, the actions shown in FIG. 8 are also exemplary, and fewer, more, or different actions could be taken as appropriate for a given application.

While FIG. 8 shows output table 800 in a report format similar to as in FIG. 6, alternative presentation formats are available. For example, when an operator is booking or checking a user in for a rental, and appropriate alert such as those shown in FIG. 7 can be sent and/or presented to the operator indicating actions to be taken such as those shown in column 840. For example, an alert could instruct the operator to ensure a deposit is secured or a credit card number is on file for a user with a history of underfill events. As another example, an alert could instruct the operator to present a suitable freebie, perk, upgrade, or any other appropriate action to a user with a history of plentiful fill events.

In some scenarios, raw fuel level data can be prone to inaccuracy; a means for addressing such inaccuracy is discussed below with reference to FIGS. 9A and 9B.

Figure 9A:
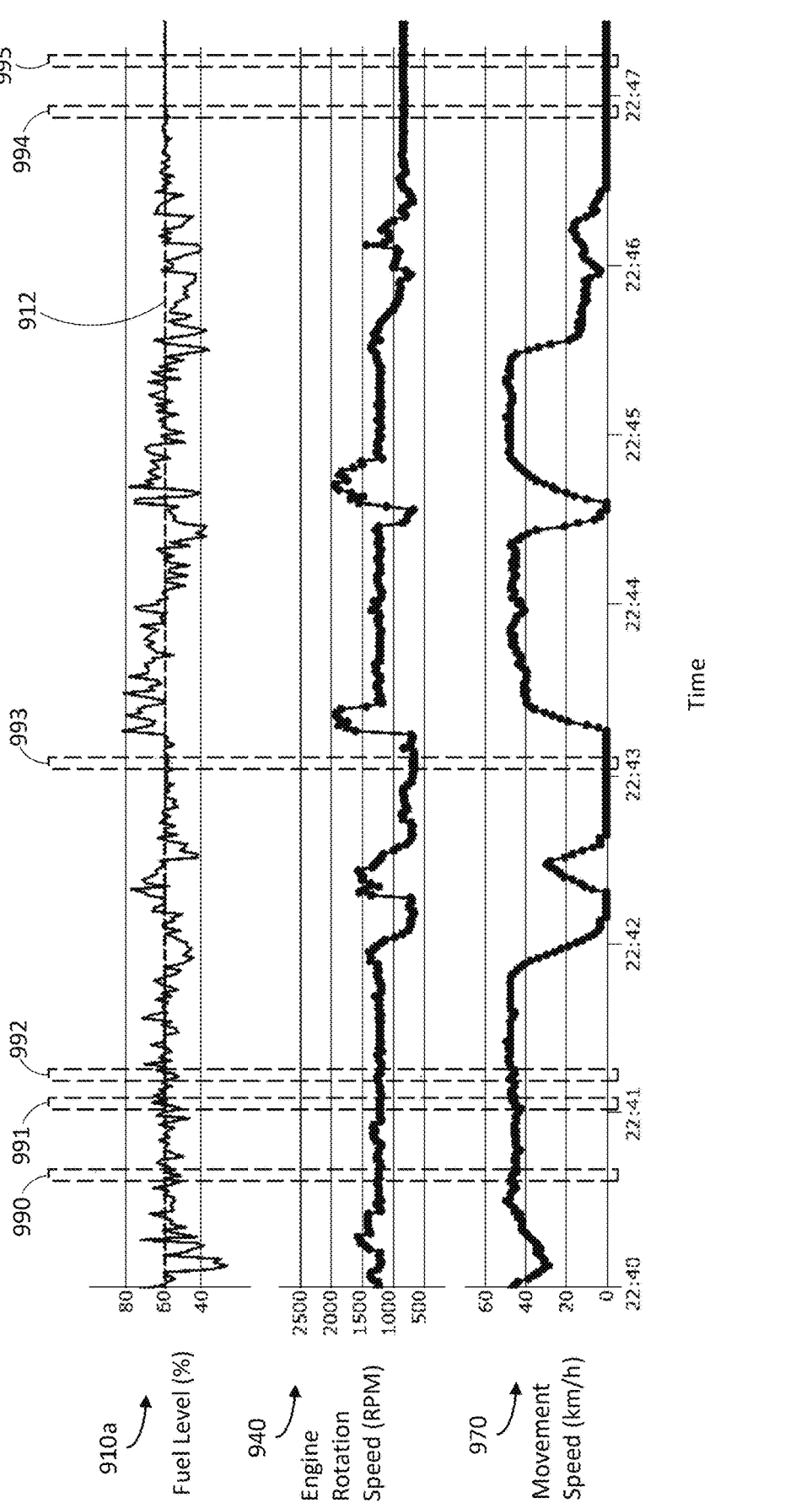
FIGS. 9A and 9B each illustrate three plots of fuel level and operation data over time, and a fuel level trend for stable regions of operation data, in accordance with at least one illustrated scenario.

FIG. 9A is a plot diagram illustrating three time-synchronized data sets across three plots.

Plot 910a shows Fuel Level over time, expressed as a percentage (as measured by a fuel level sensor). Fuel Level percentage can range from 0% (tank is read by fuel level sensor as empty) to 100% (fuel tank is read by fuel level sensor as full). A fuel level reading of 0% does not necessarily correspond to the fuel tank actually being exactly empty, nor does a fuel level reading of 100% necessarily correspond to the fuel tank being exactly full. As discussed earlier, the range of 0% to 100% typically represents a range which the fuel sensor covers (e.g. a range over which optical sensors are positioned, in the example where optical sensors are used). A fuel tank often still holds a small amount of fuel even when the fuel level sensor indicates 0%, and can often be filled to hold more fuel than what the fuel level sensor indicates as 100% (the saturation region discussed earlier).

Plot 910a indicates raw data as measured by a fuel level sensor. As is evident from plot 910a, the fuel level data swings significantly when the vehicle is in operation. For example, at approximately time 22:44:55, the fuel level sensor indicates a fuel level of about 40%, whereas at approximately time 22:44:60 (five seconds later), the fuel level reading increases to about 80%. These swings in fuel level data are commonly due to "sloshing", which refers to the fuel moving, shifting, and splashing within the fuel tank, as is normal for fluids during motion or transport. Fuel level data swings can also be caused by other factors, such as engine vibration, infrastructure movement (e.g. bridge swaying), road slope (which causes shifting of the fuel), or many other factors. As a result of all these factors, it is difficult to obtain a meaningful fuel level reading directly from a fuel level sensor. In the present disclosure, noisy or problematic fuel level data can be handled selectively to increase accuracy. Detail methods and systems for handling noisy or problematic fuel level data described in U.S. Provisional Patent Application No. 63/598,755, and US Non-Provisional patent application Ser. Nos. 18/815,344 and 18/815,371, the entirety of which are incorporated by reference herein in their entirety.

One possibility for determining a consistent fuel level is to average the fuel level data over a significant period of time (e.g. 20 minutes) or using a significant number of fuel level sensor data points (e.g. over 200 points). However, this is prone to issues. For example, such a strategy is slow to update sudden changes in actual fuel level, such as refilling the fuel tank.

FIG. 9A also shows plot 940, which indicates Engine Rotation Speed as expressed in RPM. FIG. 9A also shows plot 970, which shows vehicle Movement Speed expressed in km/h. Engine rotation speed and/or vehicle movement speed are examples of operation data representing kinetic operation of the vehicle, which can be used to identify stable fuel level data. In particular, operation data representing kinetic operation of the vehicle is accessed, and raw fuel level data is accessed. Accessing the operation data and/or the raw fuel level data can comprise capturing, collecting, or transmitting the operation data and/or raw fuel level data by a vehicle device 122 (such as telematics device 204). Accessing the operation data and/or raw fuel level data can also include receiving the data via a communication interface (e.g. communication interface 118) and/or retrieving the data from storage (e.g. non-transitory processor-readable storage medium 116). The at least one processor analyzes the operation data to identify data points outside of stability criteria. For operation data which is outside of the stability criteria, corresponding raw fuel level data is excluded from a select fuel data subset (which can be used as the "measured fuel level data" in the context of method 400). Essentially, raw fuel level data for unstable operation intervals of the vehicle is filtered out, thereby reducing inaccuracy of the fuel level data.

FIG. 9A illustrates several instances 990, 991, 992, 993, 994, and 995 where operation data (in this example, engine rotation speed data OR movement speed data) is within stability criteria. That is, one of engine RPM or speed in km/h are stable over instances 990, 991, 992, 993, 994, and 995; and as such the fuel level data within these instances can be included in the fuel level data subset (the "measured fuel level data" in the context of method 400).

FIG. 9A also shows a fuel level trend 912 which is determined based on the fuel level data in the fuel level data subset (the fuel level data in instances 990, 991, 992, 993, 994, and 995, excluding other fuel level data within the extent of plot 910*a* shown). Fuel level trend 912 in the example is determined by any appropriate technique, such as connecting points in the fuel level data subset, averaging the fuel level data in the subset, least squares regression, or ordinary least squares regression, as non-limiting examples. The fuel level trend 912 indicates that fuel level is about 60% for the time period illustrated in FIG. 9A.

Figure 9B:
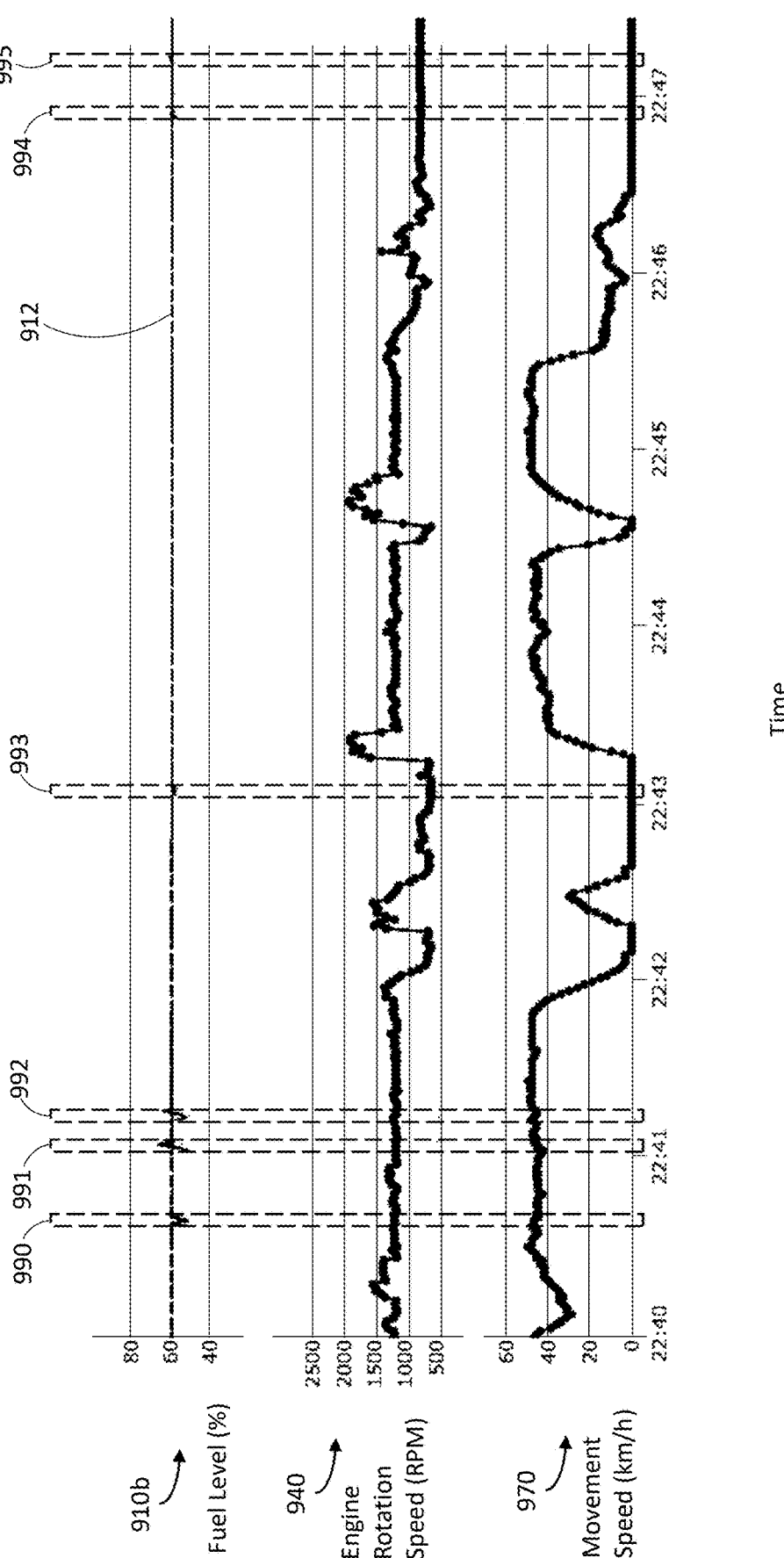

FIG. 9B is similar to FIG. 9A, but illustrates a plot 910*b* instead of plot 910*a*. Plot 910*b* is similar to plot 910*a*, except that raw fuel level data outside of instances 990, 991, 992, 993, 994, and 995 is not shown, so as to more clearly illustrate the data in the fuel level data subset and the fuel level trend 912.

FIG. 9B also shows plot 940, which indicates Engine Rotation Speed as expressed in RPM. FIG. 9B also shows plot 970, which shows vehicle Movement Speed expressed in km/h. Engine rotation speed and/or vehicle movement speed can be collected as discussed earlier.

In some implementations, fuel level data measured or collected at a vehicle device 122 (such as telematic device 204) may be simplified prior to transmission, to reduce bandwidth usage. An exemplary means for simplifying fuel level data to a simplified fuel level dataset is discussed below with reference to FIGS. 10A, 10B, 10C and 10D. The "measured fuel level data" in method 400 can be data in this simplified fuel level dataset.

The at least one processor of the vehicle device (e.g. processor 124 or 222) can generate the simplified fuel level dataset by selectively filtering data points of the raw fuel level data (or of a fuel level trend or select fuel level data subset determined as discussed with reference to FIGS. 9A and 9B). Throughout the discussion of FIGS. 10A, 10B, 10C, and 10D, reference to simplifying the "fuel level data" can refer to simplifying any of the raw fuel level data, a fuel level trend, or a select fuel level data subset, as appropriate for the given scenario based on which of these sets of data is available and is the target of simplification. In an exemplary implementation, generating the simplified fuel level dataset by selectively filtering data points of the fuel level data comprises: identifying select data points from the fuel level data for inclusion in the simplified fuel level dataset based on difference between the select data points and iteratively-defined reference lines through portions of the fuel level data. The select data points can be compiled as the simplified fuel level dataset, excluding data points which are not identified as select data points. Such an implementation is discussed by way of example below with reference to FIGS. 10A, 10B, 10C, and 10D (though other examples are also possible). In order to perform the process discussed with reference to FIGS. 10A, 10B, 10C and 10D, where a fuel level trend determined as in FIGS. 9A and 9B is being simplified (where the fuel level trend is expressed as an equation or formula), periodic data points corresponding to the fuel level trend can be analyzed (e.g. samples of the fuel level trend equation, at certain time values).

Figure 10A:
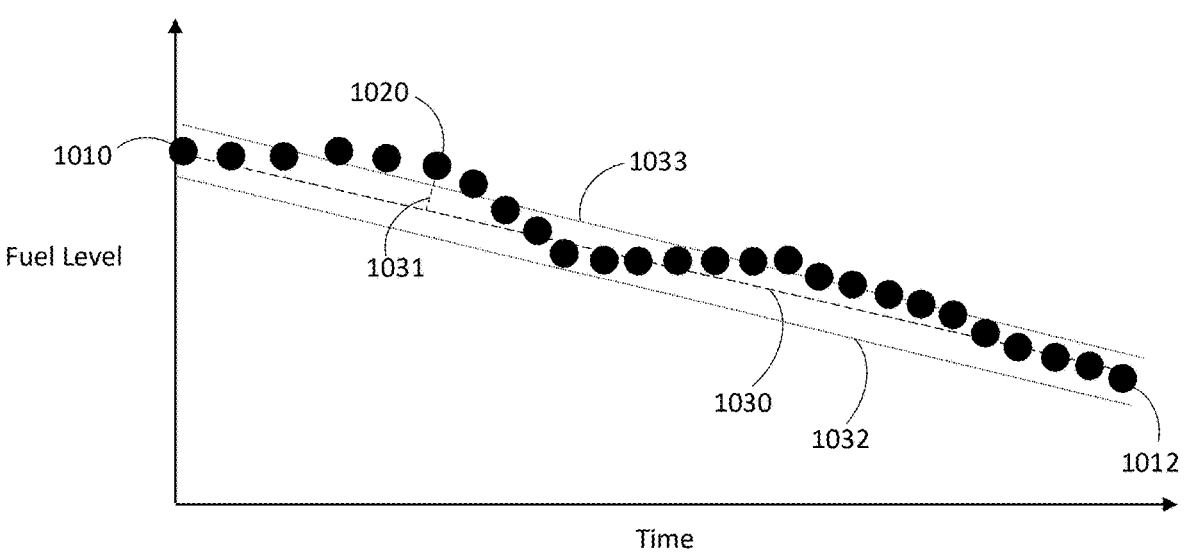
FIGS. 10A, 10B, 10C, and 10D illustrate exemplary fuel level data plots, where a simplified fuel level dataset is determined in accordance with at least one illustrated implementation.

FIG. 10A is an exemplary plot which illustrates an exemplary set of input fuel level data. FIGS. 10A, 10B, 10C, and 10D are plots which illustrate an exemplary process for generating a simplified fuel level dataset from the input fuel level data shown in FIG. 10A.

In the example of FIG. 10A each black circle represents a point of fuel level data. The fuel level data in FIGS. 10A-10D is shown using hypothetical data to illustrate the process of simplifying the data. As such the actual fuel level percentage and time are not labelled.

In the example of FIGS. 10A-10D, a "difference" between a given data point and a reference line represents a difference in fuel level represented by the data point and represented by the reference line. In this way, selecting data points from the fuel level data for inclusion in the simplified fuel level dataset, based on differences of the data points to iteratively-defined reference lines defined through portions of the fuel level data includes selecting data points from the fuel level data for inclusion in the simplified fuel level dataset, based on differences in fuel level between fuel levels represented by the data points to iteratively-defined reference lines defined through portions of the fuel level data.

Each point of data in FIGS. 10A-10D is not expressly labelled, to reduce clutter. Generally, however, data illustrated as a black circle indicates data which is not (or has not yet been) excluded from the simplified fuel level dataset. Data which has been excluded from the simplified fuel level dataset is illustrated as white circles in FIGS. 10B-10D.

In FIG. 10A, a reference line 1030 is defined between end points 1010 and 1012 of the fuel level data. In the example of FIGS. 10A-10D, reference line 1030 is a first reference line of a set of iteratively-defined reference lines as mentioned above. End points 1010 and 1012 can be defined in various ways. In some implementations, end points 1010 and 1012 can be defined as the start and end, respectively, of a trip or journey by the vehicle (e.g. when the vehicle is activated or moved, until the vehicle is deactivated or stops moving). In some implementations, end points 1010 and 1012 can be defined as the start and end, respectively, of a region of data of interest. For example, a user can provide input indicating that the data from point 1010 to point 1012 is of interest, and the generation of simplified fuel level dataset is performed over this region of interest. What is considered a region of "interest" is highly application and situation specific, and could for example refer to a region where simplification of fuel level data is considered likely to be effective (e.g. journeys over long, straight roads). In some implementations, end points 1010 and 1012 can be defined as the earliest and latest times of data points in the fuel level data subset.

In the exemplary implementation, the simplified fuel level dataset is generated by selecting data points from the fuel level data, based on differences of the data points to reference lines. In the scenario of FIG. 10A, a minimum difference between respective data points (data points sequentially between end points 1010 and 1012) and reference line 1030 is determined.

Further, a data point of the fuel level data is identified, where a minimum difference between the data point and the reference line 1030 is greater than a minimum difference between other data points being compared (sequential points between points 1010 and 1012) and the reference line 1030. That is, a data point of the fuel level data between points 1010 and 1012 is identified which is the most different from the reference line 1030. In FIG. 10A, this data point is labelled as point 1020, with the minimum difference between point 1020 and reference line 1030 illustrated by line 1031 (perpendicular to reference line 1030).

Following identification of point 1020, a determination is made as the whether the minimum difference between point 1020 and reference line 1030 exceeds a difference threshold. In practical applications, such a difference threshold could for example be 1% (for fuel level measured on a percentage scale from 0% to 100%), though other difference thresholds are possible as appropriate for a given application. In FIG. 10A, a difference threshold is illustrated around reference line 1030 as threshold lines 1032 and 1033. Point 1020 lies a distance from reference line 1030, outside of said difference threshold. Consequently, point 1020 is selected for inclusion in the simplified fuel level dataset in act 424 of method 400.

Figure 10B:
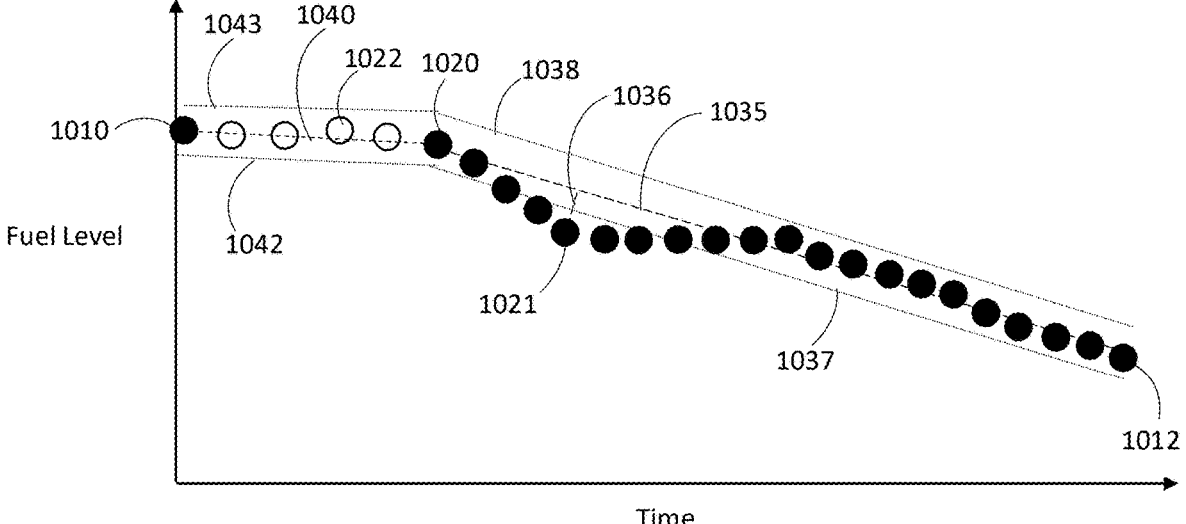

Further, the iteratively-defined reference lines are updated to include reference lines which intersect point 1020, as is shown in FIG. 10B.

FIG. 10B illustrates the fuel level data shown in FIG. 10A. In FIG. 10B, a reference line 1035 is defined between point 1020 and end point 1012 of the fuel level data. Further in FIG. 10B, a reference line 1040 is defined between end point 1010 and point 1020 of the fuel level data. In the example of FIGS. 10A-10D reference lines 1035 and 1040 are second and third reference lines of the set of iteratively-defined reference lines as mentioned above.

As discussed earlier, the simplified fuel level dataset is determined by selecting data points from the fuel level data, based on differences of the data points to reference lines. In the scenario of FIG. 10B, for reference line 1035, a minimum difference between respective data points (data points sequentially between point 1020 and 1012) and reference line 1035 is determined. A data point of the fuel level data is identified, where a minimum difference between the data point and the reference line 1035 is greater than a minimum difference between other data points being compared (sequential data points between points 1020 and 1012) and the reference line 1035. That is, a data point of the fuel level data between points 1020 and 1012 is identified which is the most different from the reference line 1035. In FIG. 10B, this data point is labelled as point 1021, with the minimum difference between point 1021 and reference line 1035 illustrated by line 1036 (perpendicular to reference line 1035).

Following identification of point 1021, a determination is made as to whether the minimum difference between point 1021 and reference line 1035 exceeds a difference threshold. In FIG. 10B, a difference threshold is illustrated around reference line 1035, shown as threshold lines 1037 and 1038. As can be seen in FIG. 10B, point 1021 lies outside of threshold lines 1037 and 1038, and therefore the minimum difference is outside of the difference threshold. Consequently, point 1021 is selected for inclusion in the simplified fuel level dataset.

Further in the scenario of FIG. 10B, for reference line 1040 in FIG. 10B, a minimum difference between respective data points (data points sequentially between end point 1010 and point 1020) and reference line 1040 is determined.

Further, a data point of the fuel level dataset data is identified, where a minimum difference between the data point and the reference line 1040 is greater than a minimum difference between other data points being compared (sequential data points between points 1010 and 1020) and the reference line 1040. That is, a data point of the fuel level data between points 1010 and 1020 is determined which is the most different from the reference line 1040. In FIG. 10B, this data point is labelled as point 1022.

Following determination of point 1022, a determination is made as the whether the minimum difference between point 1022 and reference line 1040 exceeds a difference threshold. In FIG. 10B, a difference threshold is illustrated around reference line 1040, shown as threshold lines 1042 and 1043. As can be seen in FIG. 10B, point 1022 lies within threshold lines 1042 and 1043, and therefore the difference is within the difference threshold. Consequently, point 1022 is not selected for inclusion in the simplified fuel level dataset.

Further, because point 1022 is the most different point from reference line 1040 between points 1010 and 1020, every other point between points 1010 and 1020 is also within the difference threshold illustrated by threshold lines 1042 and 1043. Consequently, every point between points 1010 and 1020 is not selected for inclusion in the simplified fuel level dataset. This is shown in FIG. 10B with these points being illustrated in white.

Figure 10C:
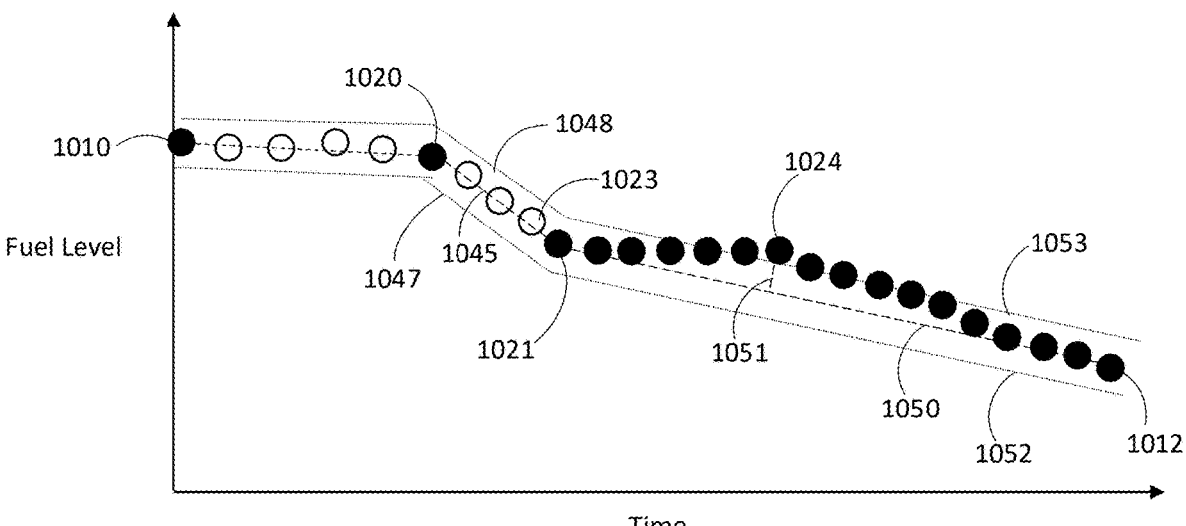

Further, the iteratively-defined reference lines are updated to include reference lines which intersect point 1021, as is shown in FIG. 10C.

FIG. 10C illustrates the fuel level data shown in FIG. 10A. In FIG. 10C, a reference line 1045 is defined between 1020 and point 1021 of the fuel level data. Further in FIG. 10C, a reference line 1050 is defined between point 1021 and end point 1012 of the fuel level data. In the example of FIGS. 10A-10D, reference lines 1045 and 1050 are fourth and fifth reference lines of the set of iteratively-defined reference lines as mentioned above.

As mentioned earlier, the simplified fuel level dataset is generated by selecting data points from the fuel level data, based on differences of the data points to reference lines. In the scenario of FIG. 10C, for reference line 1045, a minimum difference between respective data points (data points sequentially between point 1020 and point 1021) and reference line 1045 is determined.

A data point of the fuel level data is identified, where a minimum difference between the data point and the reference line 1045 is greater than a minimum difference between other data points being compared (sequential points between points 1020 and 1021) and the reference line 1045. That is, a data point of the fuel level data between points 1020 and 1021 is identified which is the most different from the reference line 1045. In FIG. 10C, this data point is labelled as point 1023.

Following determination of point 1023, a determination is made as the whether the minimum difference between point 1023 and reference line 1045 exceeds a difference threshold. In FIG. 10C, a difference threshold is illustrated around reference line 1045, shown as threshold lines 1047 and 1048. As can be seen in FIG. 10C, point 1023 lies within threshold lines 1047 and 1048, and therefore the difference is within the difference threshold. Consequently, point 1023 is not selected for inclusion in the simplified fuel level dataset. Further, because point 1023 is the most different point from reference line 1045 between points 1020 and 1021, every other point between points 1020 and 1021 is also within the difference threshold illustrated by threshold lines 1047 and 1048. Consequently, every point between points 1020 and 1021 is not selected for inclusion in the simplified fuel level dataset. This is shown in FIG. 10C with these points being illustrated in white.

Further in the scenario of FIG. 10C, for reference line 1050, a minimum difference between respective data points (data points sequentially between points 1021 and end point 1012) and reference line 1050 is determined.

Further, a data point of the fuel level data is identified, where a minimum difference between the data point and the reference line 1050 is greater than a minimum difference between other data points being compared (sequential points between points 1021 and 1012) and the reference line 1050. That is, a data point of the fuel level data between points 1021 and 1012 is identified which is the most different from the reference line 1050. In FIG. 10C, this data point is labelled as point 1024, with a distance from reference line 1050 labelled as line 1051.

Following determination of point 1024, a determination is made as to whether the minimum difference between point 1024 and reference line 1050 exceeds a difference threshold. In FIG. 10C, a difference threshold is illustrated around reference line 1050, shown as threshold lines 1052 and 1053. As can be seen in FIG. 10C, point 1024 lies outside of threshold lines 1052 and 1053, and therefore the difference is greater than the difference threshold. Consequently, point 1024 is selected for inclusion in the simplified fuel level dataset.

Figure 10D:
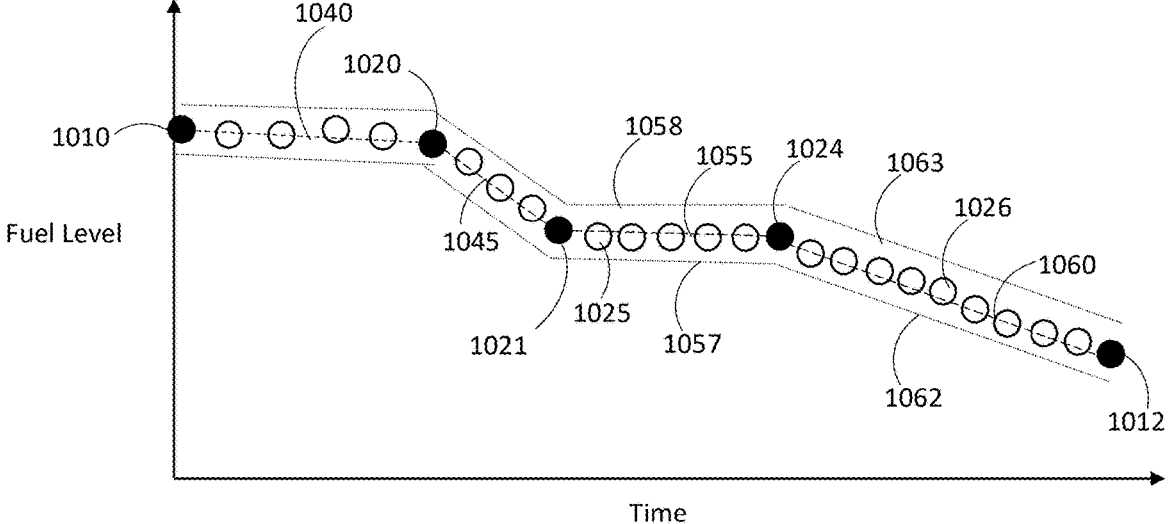

Further, the iteratively-defined reference lines are updated to include reference lines which intersect point 1024, as is shown in FIG. 10D.

FIG. 10D illustrates the fuel level data shown in FIG. 10A. In FIG. 10D, a reference line 1055 is defined between point 1021 and point 1024 of the fuel level data. Further in FIG. 10D, a reference line 1060 is defined between point 1024 and end point 1012 of the fuel level data. In the example of FIGS. 10A-10D, reference lines 1055 and 1060 are sixth and seventh reference lines of the set of iteratively-defined reference lines as mentioned above.

As mentioned earlier, the simplified fuel level dataset is generated by selecting data points from the fuel level data, based on differences of the data points to reference lines. In the scenario of FIG. 10D, for reference line 1055, a minimum difference between respective data points (data points sequentially between points 1021 and 1024) and reference line 1055 is determined.

Further, a data point of the fuel level data is identified, where a minimum difference between the data point and the reference line 1055 is greater than a minimum difference between other data points being compared (sequential points between points 1021 and 1024) and the reference line 1055. That is, a data point of the fuel level data between points 1021 and 1024 is identified which is the most different from the reference line 1055. In FIG. 10D, this data point is labelled as point 1025.

Following identification of point 1025, a determination is made as to whether the minimum difference between point 1025 and reference line 1055 exceeds a difference threshold. In FIG. 10D, a difference threshold is illustrated around reference line 1055, shown as threshold lines 1057 and 1058. As can be seen in FIG. 10D, point 1025 lies within threshold lines 1057 and 1058, and therefore the difference is within the difference threshold. Consequently, point 1025 is not selected for inclusion in the simplified fuel level dataset. Further, because point 1025 is the most different point from reference line 1055 between points 1021 and 1024, every other point between points 1021 and 1024 is also within the difference threshold illustrated by threshold lines 1057 and 1058. Consequently, every point between points 1021 and 1024 is not selected for inclusion in the simplified fuel level dataset. This is shown in FIG. 10D with these points being illustrated in white.

Further in the scenario of FIG. 10D, for reference line 1060 in FIG. 10D, a data point of the fuel level data is identified, where a minimum difference between the data point and the reference line 1060 is greater than a minimum difference between other data points being compared (sequential points between points 1024 and 1012) and the reference line 1060. That is, a data point of the fuel level data between points 1024 and 1012 is identified which is the most different from the reference line 1060. In FIG. 10D, this data point is labelled as point 1026.

Following identification of point 1026, a determination is made as to whether the minimum difference between point 1026 and reference line 1060 exceeds a difference threshold. In FIG. 10D, a difference threshold is illustrated around reference line 1060, shown as threshold lines 1062 and 1063. As can be seen in FIG. 10D, point 1026 lies within threshold lines 1062 and 1063, and therefore the difference is within the difference threshold. Consequently, point 1026 is not selected for inclusion in the simplified fuel level dataset. Further, because point 1026 is the most different point from reference line 1060 between points 1024 and 1012, every other point between points 1024 and 1012 is also within the difference threshold illustrated by threshold lines 1062 and 1063. Consequently, every point between points 1024 and 1012 is not selected for inclusion in the simplified fuel level dataset. This is shown in FIG. 10D with these points being illustrated in white.

In FIG. 10D, the fuel level data has been reduced to points which indicate end points of respective reference lines. That is, in FIG. 10D, the fuel level data has been reduced from 26 data points to 5 data points. Reference lines 1040, 1045, 1055, and 1060 between these 5 data points show a piecewise fuel level plot of the vehicle which approximates measured fuel level for the vehicle (within the above discussed difference thresholds), while requiring significantly less data points to illustrate. In essence, the selected data points 1010, 1020, 1021, 1024, and 1012 illustrate inflection points, where a fuel level of the vehicle begins to change significantly enough to be of note.

The process of fuel level data simplification discussed with reference to FIGS. 10A-10D is also called "curve logging", and is discussed in significant detail in U.S. Pat. No. 11,022,444, the entirety of which is incorporated by reference herein.

When selecting data points from the raw fuel level data for inclusion in the simplified fuel level data, the at least one processor of the vehicle device can identify a threshold data point where the fuel level becomes less than 100%. That is, the at least one processor can identify when fuel level drops below 100% (e.g. 99% or 99.9%, or any other appropriate amount as measurable by a fuel level sensor), and can include the corresponding fuel level data point in the simplified fuel level data.

Simplified fuel level data can be identified/determined as discussed above at a vehicle device (such as vehicle device 122, telematics device 204, or peripheral device 290), and subsequently transmitted to a management device (such as management device 110). For example, the simplified fuel level data can be transmitted via any of communication interfaces 128, 216, 226, and/or 118, and optionally stored at non-transitory processor-readable storage medium 116. The simplified fuel level data as transmitted (and stored) can be accessed as the measured fuel level data in acts 414 and/or 442.

Figure 11:
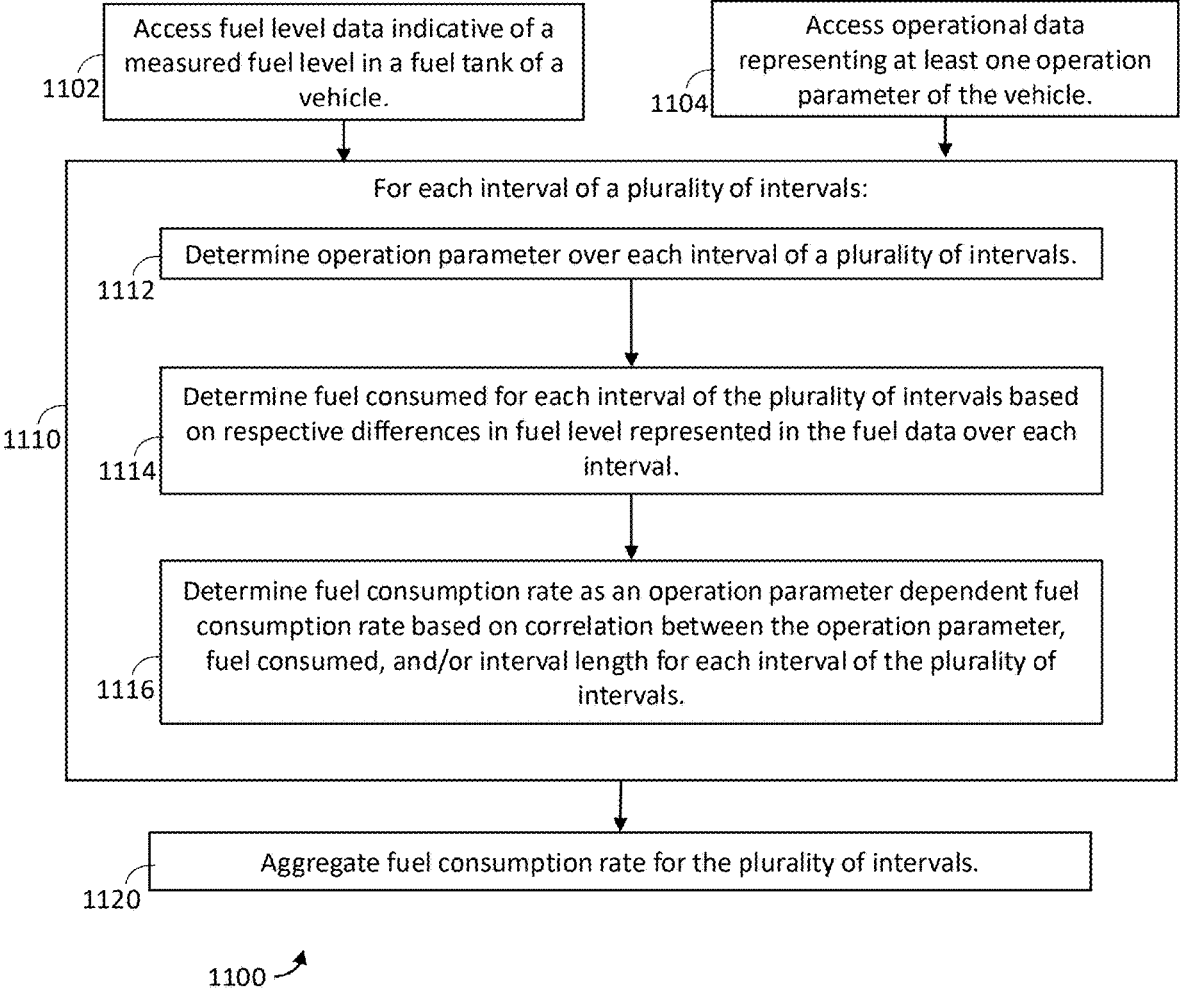
FIG. 11 is a flowchart diagram which illustrates an exemplary method for determining fuel consumption rate.

FIG. 11 is a flowchart diagram which illustrates an exemplary method 1100 for determining a dynamic fuel consumption rate associated with a vehicle. Method 1100 as illustrated includes acts 1102, 1104, and 1110 (including acts 1112, 1114, and 1116). One skilled in the art will appreciate that additional acts could be added, acts could be removed, or acts could be reordered as appropriate for a given application. With reference to the example illustrated in FIG. 1, acts can be performed by appropriate components of management device 110, vehicle devices 122, or optional device 130. For example, acts of identification, determination, generation, or general data manipulation can be performed by at least one appropriate processor (e.g. processors 114, 124, 134, 222, or 294). Further, any of the at least one non-transitory processor-readable storage mediums 116, 126, or 136 could have instructions stored thereon, which when executed by a respective at least one processor (processors 114, 124, 134, 222, or 294) cause the respective management device 110, vehicle device 122, or optional device 130 to perform a given act of method 1100. An act being performed by at least one processor 124 refers to the act being performed by any of processors 124a, 124b, 124c, or 124d. An act being performed by at least one non-transitory processor-readable storage medium 126 refers to the act being performed by any of non-transitory processor-readable storage mediums 126a, 126b, 126c, or 126d. An act being performed by communication interface 128 refers to the act being performed by any of communication interfaces 128a, 128b, 128c, or 128d. Typically, for a combination of acts performed by a combination of at least one processor, at least one non-transitory processor-readable storage medium, and a communication interface of a vehicle device, the combination of acts are performed by at least one processor, at least one non-transitory processor-readable storage medium, and a communication interface common to one of vehicle devices 122a, 122b, 122c, or 122d (or any other similar vehicle device). Generally speaking, in the context of method 1100 acts of determination are performed by at least one processor (e.g. any of processors 114, 124, 134, 222, or 294). Thus, reference to an act of determining being performed by a particular device generally refers to the act being performed by at least one processor of the device.

Method 1100 in FIG. 11 can be performed prior to method 400, in order to determine a dynamic fuel consumption rate which can be utilized in method 400 at act 446. Further, method 1100 can be performed with respect to one or more specific vehicles, but applied at a vehicle model level. That is, a dynamic fuel consumption rate can be determined for a particular vehicle or vehicles of a vehicle model, and the determined dynamic fuel consumption rate can be applied to many more vehicles of the vehicle model.

At 1102, fuel level data is accessed which is indicative of a measured fuel level in a fuel tank of a vehicle. At 1104, operation data representing at least one operational parameter of the vehicle is accessed.

Accessing the fuel level data at 1102 and accessing the operation data at 1104 could include capturing or collecting the respective data by at least one sensor, receiving the respective data by a vehicle device such as a telematics device, receiving the respective data as transmitted from a telematics device, or retrieving the respective data from storage (such as non-transitory processor-readable storage medium 116).

At 1110 the dynamic fuel consumption rate is determined for each interval of a plurality of intervals, based on the fuel level data and the operation data, and in particular based on changes in the fuel level as indicated in the fuel level data, associated with the operational data. Each interval refers to a period of time where fuel level data and operational data are available at endpoints of the interval. For example, each interval could be a respective period of time between when the vehicle is activated (turned on) versus when the vehicle is deactivated (turned off).

In some implementations, the operation data comprises location data. In some implementations, the operation data comprises speed data. Further, additional types of operation data could also be used.

At 1112, the at least one processor determines the operation parameter for each interval of a plurality of intervals, based on the operational data. Where the operational data comprises location data for the vehicle, the at least one processor determines distance travelled by the vehicle over each interval of the plurality of intervals. Where the operational data comprises speed data, the at least one processor determines speed of the vehicle over each interval of the plurality of intervals (e.g. average speed over the interval).

At 1114, the at least one processor determines fuel consumed for each interval of the plurality of intervals based on respective differences in fuel level represented in the fuel data over each interval. That is, over each interval fuel level will change; this change corresponds to fuel consumed for the interval.

At 1116, the at least one processor determines fuel consumption rate as an operation parameter dependent fuel consumption rate. This determination is based on correlation between the operation parameter, fuel consumed, and/or interval length for each interval of the plurality of intervals. Where the operational data comprises location data for the vehicle, the at least one processor determines the fuel consumption rate as a fuel consumption per distance travelled rate based on correlation between the distance travelled and the fuel consumed for each interval of the plurality of intervals. Where the operational data comprises speed data, the at least one processor determines the fuel consumption rate as a speed-dependent fuel consumption per time rate, based on correlation between vehicle speed, fuel consumed, and interval length for each interval of the plurality of intervals. In particular, the at least one processor can determine the fuel consumption rate as representing a difference in fuel level (in %), when travelling at a speed v, for a period of time t. Evaluating for a unit level of time (e.g. 1 second, 1 minute, or any other appropriate length of time), fuel consumption rate becomes difference in fuel for speed v per unit of time.

At 1120, the at least one processor aggregates fuel consumption rate for the plurality of intervals. For example, the fuel consumption rate could be average for the plurality of intervals. Where the operational data comprises location data for the vehicle, the at least one processor could average the fuel consumption per distance travelled for each interval, resulting in an overall fuel consumption per distance travelled. As another example, where the operational data comprises speed data for the vehicle, the at least one processor could average difference in fuel for speed v per unit of time for each interval, to determine an overall difference in fuel for speed v per unit of time.

In some implementations, aggregating fuel consumption rate for the plurality of intervals at 1120 comprises establishing respective fuel consumption rates for different regions of the fuel tank. For example, a respective fuel consumption rate could be established for the region 0% to 10%, the region 10% to 20%, the region 20% to 30%, the region 30% to 40%, the region 40% to 50%, the region 50% to 60%, the region 60% to 70%, the region 70% to 80%, the region 80% to 90%, and the region 90% to 100%. This could be achieved by associated fuel consumption rate for each given interval with the particular region or regions of fuel level to which the respective interval applies. The above delineations between regions (every 10%) is merely exemplary, and any delineation between regions could be used as appropriate for a given application.

Figure 12:
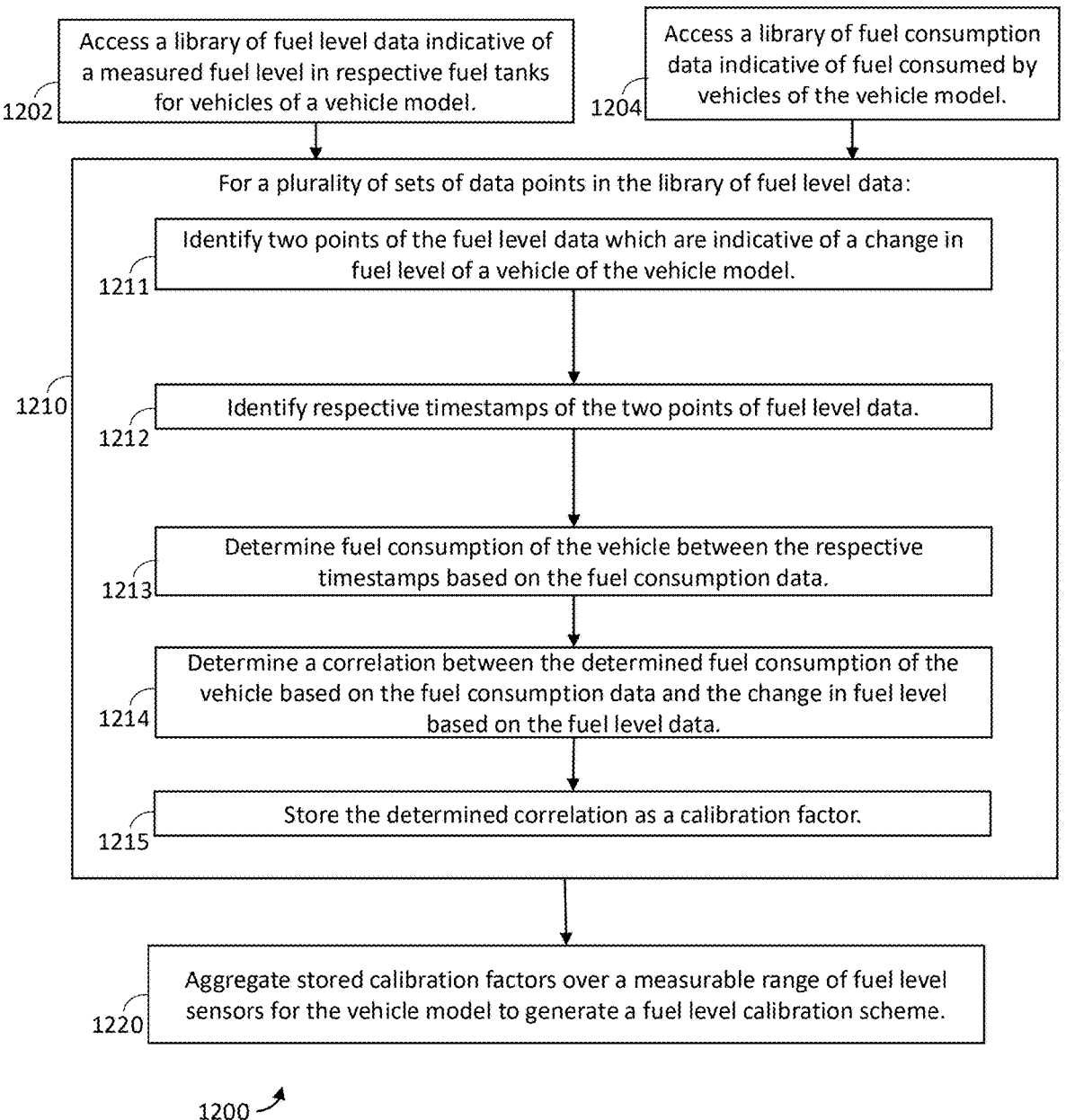
FIG. 12 is a flowchart diagram which illustrates an exemplary method for determining a fuel level calibration scheme.

FIG. 12 is a flowchart diagram which illustrates an exemplary method 1200 for generating a fuel level calibration scheme. Method 1200 as illustrated includes acts 1202, 1204, 1210 (including acts 1211, 1212, 1213, 1214, and 1215), and 1220. One skilled in the art will appreciate that additional acts could be added, acts could be removed, or acts could be reordered as appropriate for a given application. With reference to the example illustrated in FIG. 1, acts can be performed by appropriate components of management device 110, vehicle devices 122, or optional device 130. For example, acts of identification, determination, generation, or general data manipulation can be performed by at least one appropriate processor (e.g. processors 114, 124, 134, 222, or 294). Further, any of the at least one non-transitory processor-readable storage mediums 116, 126, or 136 could have instructions stored thereon, which when executed by a respective at least one processor (processors 114, 124, 134, 222, or 294) cause the respective management device 110, vehicle device 122, or optional device 130 to perform a given act of method 1200. An act being performed by at least one processor 124 refers to the act being performed by any of processors 124a, 124b, 124c, or 124d. An act being performed by at least one non-transitory processor-readable storage medium 126 refers to the act being performed by any of non-transitory processor-readable storage mediums 126a, 126b, 126c, or 126d. An act being performed by communication interface 128 refers to the act being performed by any of communication interfaces 128a, 128b, 128c, or 128d. Typically, for a combination of acts performed by a combination of at least one processor, at least one non-transitory processor-readable storage medium, and a communication interface of a vehicle device, the combination of acts are performed by at least one processor, at least one non-transitory processor-readable storage medium, and a communication interface common to one of vehicle devices 122a, 122b, 122c, or 122d (or any other similar vehicle device). Generally speaking, in the context of method 1100 acts of determination are performed by at least one processor (e.g. any of processors 114, 124, 134, 222, or 294). Thus, reference to an act of determining being performed by a particular device generally refers to the act being performed by at least one processor of the device.

At 1202, a library of fuel level data is accessed which is indicative of a measured fuel level in respective fuel tanks for vehicles of a vehicle model. At 1204, a library of fuel consumption data indicative of fuel consumed by vehicles of the vehicle model is accessed.

Accessing the library of fuel level data at 1202 and accessing the library of fuel consumption data at 1204 could include capturing or collecting the respective data by a plurality of sensors at respective vehicles, receiving the respective data by a plurality of vehicle devices such as a telematics devices, receiving the respective data as transmitted from a plurality of vehicle devices, or retrieving the respective data from storage (such as non-transitory processor-readable storage mediums 116 or 136).

At 1210, a number of acts 1211, 1212, 1213, 1214, and 1215 are performed for a plurality of sets of data points in the library of fuel level data.

At 1211, the at least one processor identifies two points of the fuel level data which are indicative of a change in fuel level of a vehicle of the vehicle model. At 1212, the at least one processor identifies respective timestamps of the two points of fuel level data (e.g. by accessing the timestamps as stored with the fuel level data).

At 1213, the at least one processor determines fuel consumption of the vehicle between the respective timestamps based on the fuel consumption data. That is, the at least one processor accesses the library of fuel consumption data, to access fuel consumption data for the vehicle between the two timestamps, and determines the amount of fuel consumed between the two timestamps.

At 1214, the at least one processor determines a correlation between the determined fuel consumption of the vehicle based on the fuel consumption data (as determined at 1213) and the change in fuel level based on the fuel level data (as determined at 1211). The determined correlation represents a relationship between fuel level measured as a percentage, and fuel consumed measured in volume, between the two data points. At 1215, the determined correlation is stored as a calibration factor.

At 1220, the at least one processor aggregates the stored fuel level adjustment factors over a measurable range of fuel sensors for the vehicle model to generate a fuel level calibration scheme. In particular, the plurality of sets of data points at 1210 are ideally extensive enough to include fuel level data which encompasses the measurable range of the fuel sensor (0% to 100%). Act 1220 can in some implementations comprise generating an equation (such as a polynomial fit to the calibration factors stored at 1215) which converts between fuel level and fuel volume. In other implementations, act 1220 includes generating a look-up table or similar (such as shown in FIG. 3), which can be accessed to convert between fuel level and fuel volume.

While the present invention has been described with respect to the non-limiting embodiments, it is to be understood that the invention is not limited to the disclosed embodiments. Persons skilled in the art understand that the disclosed invention is intended to cover various modifications and equivalent arrangements included within the scope of the appended claims. Thus, the present invention should not be limited by any of the described embodiments.

Throughout this specification and the appended claims, infinitive verb forms are often used, such as "to operate" or "to couple". Unless context dictates otherwise, such infinitive verb forms are used in an open and inclusive manner, such as "to at least operate" or "to at least couple".

The specification includes various implementations in the form of block diagrams, schematics, and flowcharts. A person of skill in the art will appreciate that any function or operation within such block diagrams, schematics, and flowcharts can be implemented by a wide range of hardware, software, firmware, or combination thereof. As non-limiting examples, the various embodiments herein can be implemented in one or more of: application-specific integrated circuits (ASICs), standard integrated circuits (ICs), programmable logic devices (PLDs), field-programmable gate arrays (FPGAs), computer programs executed by any number of computers or processors, programs executed by one or more control units or processor units, firmware, or any combination thereof.

The disclosure includes descriptions of several processors. Said processor can be implemented as any hardware capable of processing data, such as application-specific integrated circuits (ASICs), standard integrated circuits (ICs), programmable logic devices (PLDs), field-programmable gate arrays (FPGAs), logic circuits, or any other appropriate hardware. The disclosure also includes descriptions of several non-transitory processor-readable storage mediums. Said non-transitory processor-readable storage mediums can be implemented as any hardware capable of storing data, such as magnetic drives, flash drives, RAM, or any other appropriate data storage hardware.

What is claimed is:

1. A system comprising:

a telematics device positioned at the vehicle and in communication with a fuel sensor installed at the vehicle, the telematics device including:

a first communication interface;

a first at least one processor; and a first at least one non-transitory processor-readable storage medium, the first at least one non-transitory processor-readable storage medium storing first processor-executable instructions which, when executed by the first at least one processor cause the telematics device to:

collect raw fuel level data indicating a fuel level in a fuel tank of the vehicle over time from the fuel sensor;

generate simplified fuel level data over time which includes select data points from the raw fuel level data based on differences between the select data points and iteratively-defined reference lines through portions of the raw fuel level data; and transmit, by the communication interface, the simplified fuel level data over time;

a management device remote from the vehicle, the management device comprising:

a second communication interface;

a second at least one processor; and a second at least one non-transitory processor-readable storage medium, the second at least one non-transitory processor-readable storage medium storing second processor-executable instructions which, when executed by the second at least one processor cause the management device to:

receive, by the second communication interface, the simplified fuel level data over time;

identifying, by the second at least one processor, a first fuel level $f_l(t_{1e})$ for a fuel tank of the vehicle from the simplified fuel level data at an end $t_{1e}$ of a first period $t_1$;

if the first fuel level $f_l(t_{1e})$ is less than 100%, determine, by the second at least one processor, a final fuel volume $V(t_{1e})$ for the first period $t_1$ as fuel volume corresponding to the first fuel level $f_l(t_{1e})$; and if the first fuel level $f_l(t_{1e})$ is 100%:

identify, by the second at least one processor, a second fuel level $f_l(t_2)$ for the fuel tank of the vehicle from the simplified fuel level data from a start $t_{2s}$ of a second period $t_2$, the start $t_{2s}$ of the second period $t_2$ being after an end $t_{1e}$ of the first period $t_1$;

monitor, by the second at least one processor, the simplified fuel level data over time to identify a time $t_{<100}$ where the second fuel level $f_l(t_2)$ falls below 100%;

after the second fuel level $f_l(t_2)$ falls below 100% at the time $t_{<100}$ during the second period $t_2$, determine, by the second at least one processor, a fuel adjustment value $f_A$ as fuel consumed between start $t_{2s}$ of the second period $t_2$ and the time $t_{<100}$, based on a fuel consumption rate of the vehicle;

determine, by the second at least one processor, an adjusted fuel volume $V_A$ as a measurable capacity $V_{max}$ of the fuel tank plus the fuel adjustment value $f_A$; and determine, by the second at least one processor, the final fuel volume $V(t_{1e})$ for the first period $t_1$ as the adjusted fuel volume $V_A$.

2. The system of claim 1, further comprising the fuel level sensor which captures the raw fuel level data.

3. The system of claim 1, wherein the first processor-executable instructions further cause the telematics device to:

receive fuel consumption data indicating the fuel consumption rate of the vehicle during the second period.

4. The system of claim 1, wherein the second processor-executable instructions further cause the management device to:

access an indication of initial fuel volume $V(t_{1s})$ for start tis of the first period $t_1$; and determine, by the second at least one processor, a difference D between the initial fuel volume $V(t_{1s})$ and the final fuel volume $V(t_{1e})$.

5. The system of claim 4, wherein:

the first period $t_1$ is a period where the vehicle is provided for use by a first user;

the second period $t_2$ is a period where the vehicle is provided for use by a second user different from the first user; and the second processor-executable instructions further cause the to:

access an account associated with the first user; and balance the account associated with the first user in accordance with the difference D.

6. The system of claim 4, wherein the second processor-executable instructions further cause the system to:

compare, by the second at least one processor, the difference D to a threshold; and if the difference D exceeds the threshold, send an alert to a system operator indicating the difference D exceeds the threshold.

7. The system of claim 1, wherein the second processor-executable instructions further cause the management device to: access the fuel consumption rate for the vehicle as a stored nominal fuel consumption rate.

8. The system of claim 1, wherein the second processor-executable instructions further cause the management device to, prior to the first period:

access historic fuel level data for the vehicle as collected by the fuel sensor;

access operational data for the vehicle as collected by a telematics device installed at the vehicle; and determine, by the second at least one processor, the fuel consumption rate as a dynamic fuel consumption rate based on changes in fuel level as indicated in the historic fuel level data, associated with the operational data.

9. The system of claim 8, wherein:

the operational data for the vehicle comprises location data for the vehicle; and the second processor-executable instructions which cause the second at least one processor to determine the fuel consumption rate as a dynamic fuel consumption rate based on changes in fuel level as indicated in the historic fuel level data, associated with the operational data, cause the second at least one processor to:

determine distance travelled by the vehicle over each interval of a plurality of intervals based on the location data;

determine fuel consumed for each interval of the plurality of intervals based on a respective difference in fuel level represented in the historic fuel level data over each interval; and determine the fuel consumption rate as a fuel consumption per distance travelled rate based on correlation between the distance travelled and the fuel consumed for each interval of the plurality of intervals.

10. The system of claim 8, wherein:

the operational data comprises speed data for the vehicle; and the second processor-executable instructions which cause the second at least one processor to determine the fuel consumption rate as a dynamic fuel consumption rate based on changes in fuel level as indicated in the historic fuel level data, associated with the operational data, cause the second at least one processor to:

determine speed of the vehicle over each interval of a plurality of intervals;

determine fuel consumed for each interval of the plurality of intervals based on a respective difference in fuel level represented in the historic fuel level data over each interval; and determine the fuel consumption rate as a speed-dependent fuel consumption per time rate based on correlation between vehicle speed, fuel consumed, and interval length for each interval of the plurality of intervals.

11. The system of claim 1, wherein the first processor-executable instructions further cause the telematics device to:

identify, by the first at least one processor, a threshold data point based on when the raw fuel level data indicates that fuel level of the vehicle has dropped below 100%; and include, by the first at least one processor, the data corresponding to the threshold data point in the simplified fuel level data.

12. The system of claim 1, wherein the first processor-executable instructions which cause the first at least one processor to generate the simplified fuel level data based on differences between the select data points and iteratively-defined reference lines through portions of the raw fuel level data, cause the first at least one processor to, for each data point of the raw fuel level data:

determine a minimum difference between the data point and a corresponding reference line of the iteratively-defined reference lines, where the data point is included in the simplified fuel level data if the minimum difference between the data point and the corresponding reference line exceeds a difference threshold.

13. The system of claim 1, wherein the first processor-executable instructions which cause the first at least one processor to generate the simplified fuel level data based on differences between the select data points and iteratively-defined reference lines through portions of the raw fuel level data, cause the first at least one processor to:

define a reference line through the raw fuel level data;

identify a data point of the raw fuel level data, where a minimum difference between the data point and the reference line is greater than a minimum difference between other data points and the reference line; and if the minimum difference between the data point and the reference line exceeds a difference threshold:

select the data point for inclusion in the simplified fuel level data; and define new reference lines which intersect the sample point through the raw fuel level data.

14. The system of claim 13, wherein the first processor-executable instructions which cause the first at least one processor to generate the simplified fuel level data based on differences between the select data points and iteratively-defined reference lines through portions of the raw fuel level data, further cause the first at least one processor to:

define an additional reference line through the raw fuel level data which intersects a data point previously selected for inclusion in the simplified fuel level data;

identify an additional data point of the raw fuel level data, where a minimum difference between the additional data point and the additional reference line is greater than a minimum difference between other data points and the additional reference line; and if the minimum difference between the additional data point and the additional reference line exceeds the difference threshold: select the additional data point for inclusion in the simplified fuel level data.

* * * * *